US012062252B2

United States Patent
Kezele et al.

(10) Patent No.: US 12,062,252 B2
(45) Date of Patent: Aug. 13, 2024

(54) METHOD, DEVICE, AND MEDIUM FOR ADAPTIVE INFERENCE IN COMPRESSED VIDEO DOMAIN

(71) Applicants: Irina Kezele, North York (CA); Mostafa Shahabinejad, Richmond Hill (CA); Seyed shahabeddin Nabavi, Toronto (CA); Wentao Liu, Maple (CA); Yuanhao Yu, Markham (CA); Rui Xiang Chai, Waterloo (CA); Jin Tang, Markham (CA); Yang Wang, Winnipeg (CA)

(72) Inventors: Irina Kezele, North York (CA); Mostafa Shahabinejad, Richmond Hill (CA); Seyed shahabeddin Nabavi, Toronto (CA); Wentao Liu, Maple (CA); Yuanhao Yu, Markham (CA); Rui Xiang Chai, Waterloo (CA); Jin Tang, Markham (CA); Yang Wang, Winnipeg (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 347 days.

(21) Appl. No.: 17/538,516

(22) Filed: Nov. 30, 2021

(65) Prior Publication Data
US 2023/0169794 A1    Jun. 1, 2023

(51) Int. Cl.
*G06V 40/20*    (2022.01)
*G06N 5/04*    (2023.01)
(Continued)

(52) U.S. Cl.
CPC .............. *G06V 40/20* (2022.01); *G06N 5/04* (2013.01); *G06V 10/62* (2022.01); *G06V 10/778* (2022.01);
(Continued)

(58) Field of Classification Search
CPC ...... G06V 40/20; G06V 10/62; G06V 10/778; G06V 10/94; G06V 30/1912;
(Continued)

(56) References Cited

U.S. PATENT DOCUMENTS 6,807,231 B1 * 10/2004 Wiegand ................ H04N 19/51
375/E7.262
11,270,124 B1 * 3/2022 Carvalho ............... G06V 20/46
(Continued)

OTHER PUBLICATIONS

Korbar, Bruno et al. "SCSampler: Sampling Salient Clips From Video for Efficient Action Recognition." 2019 IEEE/CVF International Conference on Computer Vision (ICCV) (2019).
(Continued)

*Primary Examiner* — John B Strege

(57) ABSTRACT

Methods, devices and computer-readable media for processing a compressed video to perform an inference task are disclosed. Processing the compressed video may include selecting a subset of frame encodings of the compressed video, or zero or more modalities (RGB, motion vectors, residuals) of a frame encoding, for further processing to perform the inference task. Pre-existing motion vector and/or residual information in frame encodings of the compressed video are leveraged to adaptively and efficiently perform the inference task. In some embodiments, the inference task is an action recognition task, such as a human action recognition task.

4 Claims, 13 Drawing Sheets

(51) Int. Cl.
*G06V 10/62* (2022.01)
*G06V 10/778* (2022.01)
*G06V 10/94* (2022.01)
*G06V 30/19* (2022.01)

(52) U.S. Cl.
CPC .......... *G06V 10/94* (2022.01); *G06V 30/1912* (2022.01); *G06V 30/19127* (2022.01)

(58) Field of Classification Search
CPC .... G06V 30/19127; G06V 20/41; G06N 5/04; G06N 3/0475; G06N 3/092; G06N 3/0442; G06N 3/045; G06N 3/0464; G06N 3/08; H04N 19/51
See application file for complete search history.

(56) References Cited

U.S. PATENT DOCUMENTS

| | | | | |
|---|---|---|---|---|
| 2003/0007555 | A1* | 1/2003 | Divakaran | G06F 16/7864 707/E17.058 |
| 2010/0183075 | A1* | 7/2010 | Furukawa | H04N 19/58 375/E7.123 |
| 2019/0124347 | A1* | 4/2019 | Stolt | H04N 19/147 |
| 2022/0207657 | A1* | 6/2022 | Petkov | G06T 5/50 |
| 2022/0309289 | A1* | 9/2022 | Kawaski | G06F 18/2148 |
| 2023/0109825 | A1* | 4/2023 | Wang | H04N 19/159 375/240.12 |

OTHER PUBLICATIONS

Zhi, Yuan et al. "MGSampler: An Explainable Sampling Strategy for Video Action Recognition." ArXiv abs/2104.09952 (2021): n. pag.

Panda, Rameswar et al. "AdaMML: Adaptive Multi-Modal Learning for Efficient Video Recognition." ArXiv abs/2105.05165 (2021): n. pag.

Wu, Zuxuan et al. "LiteEval: A Coarse-to-Fine Framework for Resource Efficient Video Recognition." NeurIPS (2019).

Meng, Yue et al. "AR-Net: Adaptive Frame Resolution for Efficient Action Recognition." ECCV (2020).

Wang, Yulin et al. "Adaptive Focus for Efficient Video Recognition." ArXiv abs/2105.03245 (2021): n. pag.

Wu, Chao-Yuan et al. "Compressed Video Action Recognition." 2018 IEEE/CVF Conference on Computer Vision and Pattern Recognition (2018): 6026-6035.

* cited by examiner

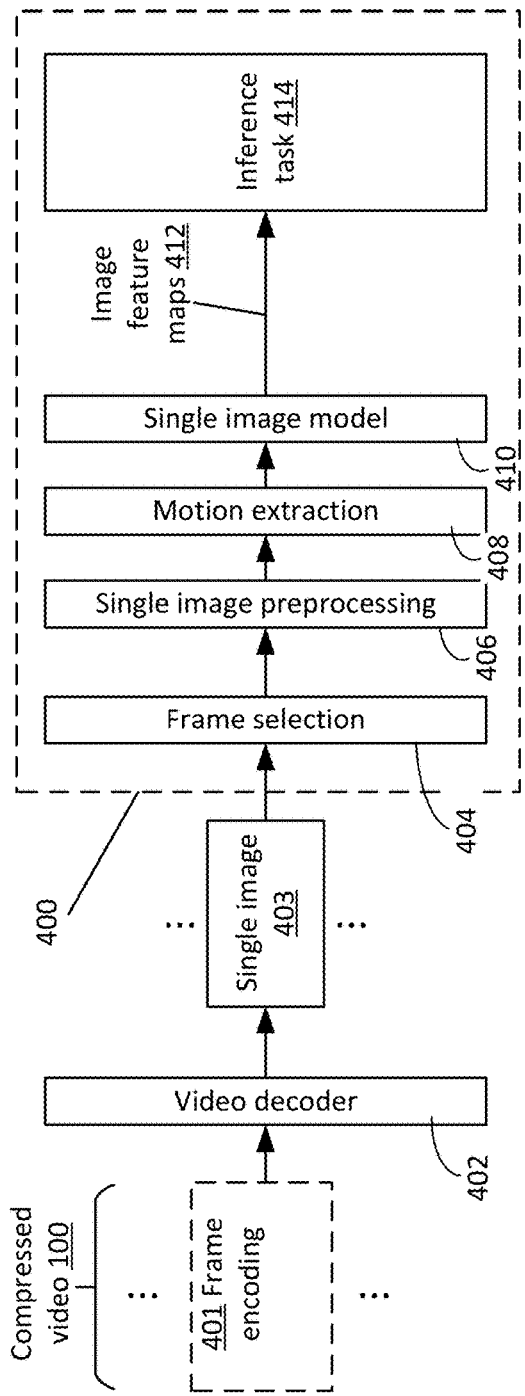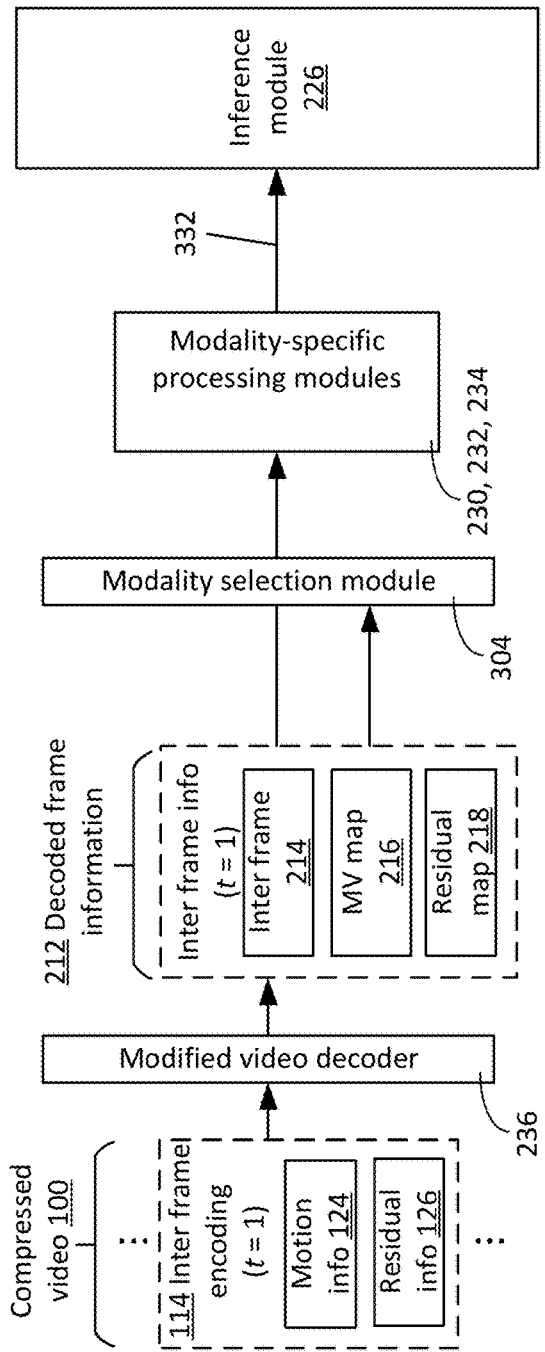

METHOD, DEVICE, AND MEDIUM FOR ADAPTIVE INFERENCE IN COMPRESSED VIDEO DOMAIN

RELATED APPLICATION DATA

This is the first patent application related to this matter.

TECHNICAL FIELD

The present disclosure relates to video content classification, and in particular, to a method, device, and computer-readable medium for adaptively performing an inference task to classify the video content using the information from the compressed video domain.

BACKGROUND

There is an abundance of video data coming from sources like social media and smart devices, and from a variety of industrial applications, including surveillance and autonomous driving for example (it has been reported as of 2021 that video data occupies 82% of global IP traffic). As video inherently includes a temporal dimension, video data (i.e. data encoding a video, the video including a temporal sequence of images called frames) arguably encodes much more useful information than still images, for a variety of computer vision tasks. However, video data size is proportionally larger than image data, making video data costly to process and analyze. The latter is a particular challenge for applications on edge devices with limited storage and computational capacity, and especially for tasks requiring high computational efficiency. Nonetheless, despite its large size, video data can be drastically compressed, thanks to its innate redundancy, making the useful content compact.

Action recognition is a sub-field of computer vision that seeks to classify activity visible within video data. In particular, human activity recognition (hereinafter simply "AR") is a problem domain that has been the subject of extensive research. AR seeks to perform an inference task on video data, wherein the inference task is the classification of human behaviors visible within the video. AR techniques typically define a set of classes of human behavior; trained AR models are applied to video data to generate inference data, which typically includes a probability distribution across the set of classes indicating the inferred likelihood that each class of behavior is visible within the video.

With the emergence of sophisticated deep learning techniques, several mainstream approaches to AR using video data have been proposed. Per-frame processing approaches seek to process video data on a frame-by-frame basis. Some per-frame approaches process an entire video, or a video clip (e.g., a temporally trimmed segment of a longer video), using convolutional neural networks (CNNs) performing two-dimensional convolution operations ("2D CNNs"). The videos or video clips may be processed either exclusively in the domain of 2D pixel images, using the red-green-blue (RGB) color values of each pixel of a video frame (hereinafter the "RGB domain"), or in a hybrid domain combining RGB data and an explicit temporal component modeling. For example, temporal component modelling can be performed by using optical flow between frames and/or recurrent neural network (RNN) processing. Other per-frame approaches use CNNs to perform 3D convolution (3D CNNs) on video clips, thereby implicitly encoding temporal information relating to individual video clips. The 3D CNN per-frame approaches have not generally demonstrated important improvements accuracy-wise relative to 2D CNN per-frame approaches, despite requiring exponentially heavier (i.e. more computationally intensive) processing. However, various attempts have recently been made to reduce the computational burden of 3D CNNs, and to improve the accuracy of 3D CNN-based approaches, for example by "inflating" the basic 2D CNN architecture to include a temporal dimension. For examples of these "inflation"-based 2D CNN approaches, see, e.g., (Carreira, Joao and Andrew Zisserman. "Quo Vadis, Action Recognition? A New Model and the Kinetics Dataset." 2017 IEEE Conference on Computer Vision and Pattern Recognition (CVPR) (2017): 4724-4733); as well as (Feichtenhofer, Christoph. "X3D: Expanding Architectures for Efficient Video Recognition." 2020 IEEE/CVF Conference on Computer Vision and Pattern Recognition (CVPR) (2020): 200-210).

A number of adaptive approaches have also been proposed for AR using video data. Adaptive approaches seek to improve both the efficiency (e.g., inference processing time), and potentially the accuracy as well, of AR techniques. Some adaptive approaches preprocess video data using computationally light techniques, followed by decision making to either a) preview the video to select subsets of informative frames or clips for processing, the subsets of frames or clips being treated as subsets of the entire video, or b) to process the entire video adaptively, by defining learnable policies that make sequential decisions about how to process each frame. In particular, the learnable policies are typically limited to making decisions about the image resolution to use in processing the RGB frame, and/or the capacity or type of model (e.g., CNN) used to process the RGB frame. The learnable policies may make these decisions based on the frame content, and may also potentially consider the local or global context, such as the content of nearby frames in the temporal sequence, or the totality of the video frames. Some adaptive approaches also leverage other modalities, such as audio, to achieve further efficiencies in AR, particularly in long untrimmed videos: for example, audio content of a frame or clip may be used to predict its salience for processing for AR.

The adaptive approaches described above typically use video frames from the raw, uncompressed video domain (i.e. RGB images) to perform the decision-making about which frames or clips to select, or about how to process the frames.

Adaptive approaches to video AR, relevant to this disclosure, can be broadly classified into following three general categories: clip-based approaches, frame selection approaches, and online approaches. Clip-based approaches typically process multiple clips per video with light-weight models (such as lightly parameterized CNNs) to select informative or salient clips. The selected clips are then processed with heavier and more accurate models (such as heavily parameterized CNNs). Most of these approaches work with raw (uncompressed) video data, and only one approach uses the compressed video domain (Korbar, Bruno et al. "SCSampler: Sampling Salient Clips From Video for Efficient Action Recognition." 2019 *IEEE/CVF International Conference on Computer Vision (ICCV)* (2019): 6231-6241). Frame selection approaches also perform video selection with light-weight models, but on a per-frame basis instead of a per-clip basis. The selected frames are then processed with heavier and more accurate models. All existing frame selection approaches to adaptive AR operate in uncompressed video domain. What we will refer to in-here as "Online approaches", select individual frames, like frame selection approaches, but they operate sequentially, often taking into account the information on short and long-term relations to prior video frames in the temporal sequence. Frames are selected using a light-weight model, as in the clip-based and frame selection approaches described above. The selected frames are then processed using adapted model capabilities: e.g., differently parameterized models may be used to process different selected frames based on the decisions made by the light-weighted model performing the frame selection. Like the frame selection approaches described above, online approaches operate on video frames in the uncompressed video domain.

Each of these existing adaptive approaches to AR can potentially realize efficiencies by selectively and/or adaptively processing only certain selected frames or clips from a longer video. However, the existing approaches still require significant computational resources, including processor cycles and memory use, to process the high dynamic range RGB video frames, even if that is done only sparsely (i.e. processing only the selected RGB frames). In addition, in order to explicitly take temporal information or context into account, these methods typically have to generate this temporal or contextual information by performing further processing of multiple RGB video frames, which adds to the computational load. This is particularly undesirable for processing on devices with low power and/or computational resources (e.g., smart phones). Likewise, to include temporal information in the frame selection process, additional RGB processing is required.

In view of the foregoing, improvements to adaptive AR techniques are desirable, and there is a need for a method for adaptive action recognition, and more generally for selection and/or adaptive processing of video frames based on their salience to a given inference task, that overcomes one or more of the limitations of existing approaches identified above.

SUMMARY

The present disclosure provides methods, devices and computer-readable media for processing a compressed video, and optionally also RGB data from an uncompressed video, to perform an inference task. In some examples, RGB images corresponding to each compressed video inter-frame are reconstructed, to allow for all three modalities: RGB, motion vectors and residuals to be used simultaneously, without using a separate uncompressed video source. In some examples, processing the compressed video may include selecting a subset of frame encodings of the compressed video for further processing to perform the inference task. In some embodiments, the inference task is an action recognition task, such as a human action recognition task.

Videos are normally stored and transmitted in compressed video formats containing rich and free motion information and residual information used to decode or reconstruct individual video frames. By leveraging the motion information and residual information in compressed video data, embodiments described herein are able to skip the time-consuming motion-estimation step for most frames and directly utilize the motion information included in the inter frame encodings of the compressed video.

In some examples, the motion information and/or residual information can be analyzed separately or together with RGB information from the same inter-frame, to make decisions about which frames from the compressed domain or which RGB images corresponding to those frames to include or exclude from a subset of frames (over all three modalities), used in further processing to perform an inference task. In other embodiments, the motion information and/or residual information from the compressed domain can be analyzed separately or together with corresponding RGB frames to make decisions about which modalities (e.g., a motion vector map, a residual map, and/or the RGB image) will be included or excluded from further processing in furtherance of performing the inference task. Some embodiments use a decision module to make the decisions about each inter frame and/or each modality thereof, and an inference model to process those frames or modalities selected for inclusion in the further processing, both of which are trained jointly as an end-to-end trained machine learning model. Some embodiments use a decision module that is configured to select frames to include in a subset of frames, and the subset of frames is stored for later processing by a pre-trained inference model to perform the inference task.

As used herein, the term "frame" refers to a video frame, i.e. a two-dimensional image included as one of a temporal sequence of images of a video.

As used herein, "frame encoding" refers to data that may be used by a decoder to decode, generate, or reconstruct a frame. A "compressed video" or "compressed video stream" refers to data which includes multiple frame encodings, typically representative of a temporal sequence of frames. A compressed video or a portion thereof may be referred to as "compressed video data".

As used herein, the term "prediction task" refers to a task performed by a model, whereby one or more data samples provided as input to the model result in prediction information being generated by the model, the prediction information predicting one or more conclusions based on the data sample(s) used as input. In the context of machine learning, the model may be trained to perform the prediction task. Prediction tasks include classification tasks, in which the prediction data may include a predicted class, or a probability distribution over one or more classes, for each data sample, or for portions of each data sample, received as input.

As used herein, the term "model" refers to a probabilistic, mathematical, or computational model used to process input data to generate prediction information regarding the input data. In the context of machine learning, a "model" refers to a model trained using machine learning techniques; the term "network" may refer to a model trained using machine learning that is configured as an artificial neural network or other network structure. The term "subnetwork" refers to a portion of network or other model.

As used herein, statements that a second item (e.g., a value, calculation, or decision) is "based on" a first item may mean that characteristics of the second item are affected or determined at least in part by characteristics of the first item. The first item may be considered an input to an operation or calculation, or a series of operations or calculations, that produces the second item as an output that is not independent from the first item. Similarly, if one or more inputs are processed to generate the second item, then the second item may be considered to be based on each of the inputs. If a first item is "excluded" from the processing of various inputs to generate the second item, then the second item is not based on the first item and the characteristics of the second item may be considered to be independent from the first item. For example, if a video frame is deemed non-salient to an inference task, the video frame may be "skipped" or excluded from further processing in furtherance of performing the inference task. On the other hand, if the video frame is deemed to be salient, the video frame may be "kept" and included in the further processing, such that the output of the further processing in furtherance of the inference task is based on the video frame.

In some aspects, the present disclosure describes a method for processing a compressed video to perform an inference task. The method comprises several steps. An inter frame encoding of the compressed video representative of an inter frame in a temporal sequence of frames is obtained. The inter frame encoding comprises temporal information of the inter frame relative to a reference frame in the temporal sequence of frames. At least a portion of the temporal information is processed to generate decision information. The decision information indicates which, if any, of one or more modalities of the inter frame encoding are to be processed to perform the inference task.

In some aspects, the present disclosure describes a device, comprising a processor and a memory storing instructions which, when executed by the processor, cause the device to process a compressed video to perform an inference task by performing several steps. An inter frame encoding of the compressed video representative of an inter frame in a temporal sequence of frames is obtained. The inter frame encoding comprises temporal information of the inter frame relative to a reference frame in the temporal sequence of frames. At least a portion of the temporal information is processed to generate decision information. The decision information indicates which, if any, of one or more modalities of the inter frame encoding are to be processed to perform the inference task.

In some examples, the method further comprises, in response to determining that the decision information indicates that no modalities of the inter frame are to be processed: processing video frame modality data, based on a plurality of frame encodings of the compressed video data, to perform the inference task, wherein the inter frame encoding is excluded from said processing.

In some examples, the method further comprises, in response to determining that the decision information indicates that at least one modality of the inter frame is to be processed: processing video frame modality data, based on a plurality of frame encodings of the compressed video data, to perform the inference task, wherein the at least one modality of the inter frame encoding is included in said processing.

In some examples, the temporal information comprises motion information of the inter frame relative to the reference frame, and residual information of the inter frame relative to a motion-adjusted reference frame. The at least one modality of the inter frame encoding includes one or both of the following: the motion information, and the residual information.

In some examples, the method further comprises decoding the inter frame encoding to generate the inter frame. The at least one modality of the inter frame encoding is one or more of the following: the motion information, the residual information, and the inter frame.

In some examples, processing the at least portion of the temporal information to generate the decision information comprises processing the motion information and the residual information to generate the decision information.

In some examples, the method further comprises providing an end-to-end trained model, comprising a decision module and an inference module. The step of processing the motion information and the residual information to generate the decision information is performed by the decision module, and the step of processing the video frame modality data to perform the inference task includes: processing the at least one modality of the inter frame encoding to generate inter frame feature information, and processing the inter frame feature information, using the inference module, to perform the inference task.

In some examples, the end-to-end trained model further comprises one or more modality-specific processing modules. Processing the at least one modality of the inter frame encoding to generate inter frame feature information comprises, for each respective modality of the at least one modality, processing the respective modality of the inter frame using a respective modality-specific processing module.

In some examples, the inter frame feature information comprises spatially weighted inter frame feature information. For each respective modality of the at least one modality, processing the respective modality of the inter frame using a respective modality-specific processing module comprises generating spatial salience information based on the respective modality, and processing the respective modality and the spatial salience information to generate the spatially weighted inter frame feature information.

In some examples, the inter frame feature information comprises, for each respective modality of the at least one modality, respective modality-specific inter frame feature information. Processing the inter frame feature information, using the inference module, to perform the inference task comprises fusing the modality-specific inter frame feature information of all modalities of the at least one modality to generate fused inter frame feature information, and processing the fused inter frame feature information to perform the inference task.

In some examples, the inter frame feature information comprises, for each respective modality of the at least one modality, respective modality-specific inter frame feature information. Processing the inter frame feature information, using the inference module, to perform the inference task comprises, for each respective modality-specific inter frame feature information of each respective modality of the at least one modality, processing the respective modality-specific inter frame feature information to generate respective modality-specific inference information, and fusing the modality-specific inference information of all modalities of the at least one modality to perform the inference task.

In some aspects, the present disclosure describes a method for selecting a subset of frames decoded from a compressed video for further processing to perform an action recognition task or to train a model to perform the action recognition task. The method comprises a number of steps. A plurality of inter frame encodings of the compressed video representative of a temporal sequence of frames are obtained. The plurality of inter frame encodings comprise a first inter frame encoding representative of a first inter frame at the beginning of the temporal sequence of frames, a second inter frame encoding representative of a second inter frame at the end of the temporal sequence of frames, and a plurality of intermediate inter frame encodings. Each intermediate inter frame encoding is representative of an inter frame between the first inter frame and the second inter frame in the temporal sequence of frames. Each intermediate inter frame encoding comprises motion information of the respective intermediate inter frame relative to a respective reference frame in the temporal sequence of frames. The motion information of the plurality of intermediate inter frame encodings is processed to generate cumulative motion information representative of motion between the first inter frame and the second inter frame. The cumulative motion information is processed to generate decision information.

The decision information indicates whether the second inter frame should be included in the subset of frames. The subset of frames is selected based on the decision information.

In some examples, processing the motion information of the plurality of intermediate inter frame encodings to generate cumulative motion information comprises, for each frame encoding of the plurality of intermediate inter frame encodings, processing the motion information to generate a motion vector field. The motion vector fields of all frame encodings of the plurality of intermediate inter frame encodings are processed to generate a cumulative motion vector field. The cumulative motion vector field is processed to generate a maximum absolute magnitude of the cumulative motion vector field. Processing the cumulative motion information to generate decision information comprises comparing the maximum absolute magnitude of the cumulative motion vector field to a motion threshold to determine whether the second inter frame should be included in the subset of frames.

In some examples, the method further comprises, after selecting the subset of frames, storing the subset of frames for subsequent processing by a trained inference model to perform the action recognition task, or to train an inference model to perform the action recognition task.

In some aspects, the present disclosure describes a non-transitory processor-readable medium having tangibly stored thereon instructions that, when executed by a processor of a device, cause the device to perform one or more of the methods described above.

By using compressed video data for adaptive inference, examples embodiments may provide an efficient set of models for performing efficient processing of individual compressed videos, by exploiting the pre-existing motion and/or residual information already encoded in compressed video data, and by using 2D convolution to extract temporal information from individual frames, MV maps, and residual maps. The low dynamic-range of MV and residual maps allows for modelling with very light models (i.e. models of small capacity), and hence allows for significant computational and power savings. Some such embodiments may thereby optimize the processing time for performing the inference task on a given video, which may be especially important for power- and computationally-constrained platforms such as edge devices.

Furthermore, using compressed video data for adaptive AR or other adaptive inference tasks may reduce memory usage relative to existing approaches. The model capacity required by some described embodiments may be smaller than existing approaches configured to process RGB data, thanks to the sparse and compact representations of motion and residual data relative to RGB data.

By decreasing processing time and/or memory usage, power consumption may also be reduced, thereby extending the battery life of the device performing the processing, such as a mobile device.

BRIEF DESCRIPTION OF THE DRAWINGS

Embodiments will now be described by way of examples with reference to the accompanying drawings, in which like reference numerals may be used to indicate similar features.

FIG. 4A is a simplified block diagram of an example conventional adaptive AR process reconfigured to operate on compressed video, showing limitations of existing adaptive AR techniques.

FIG. 4B is a simplified block diagram of the example adaptive AR software system of FIG. 3A or 3B operating on compressed video.

DESCRIPTION OF EXAMPLE EMBODIMENTS

Figure 1:
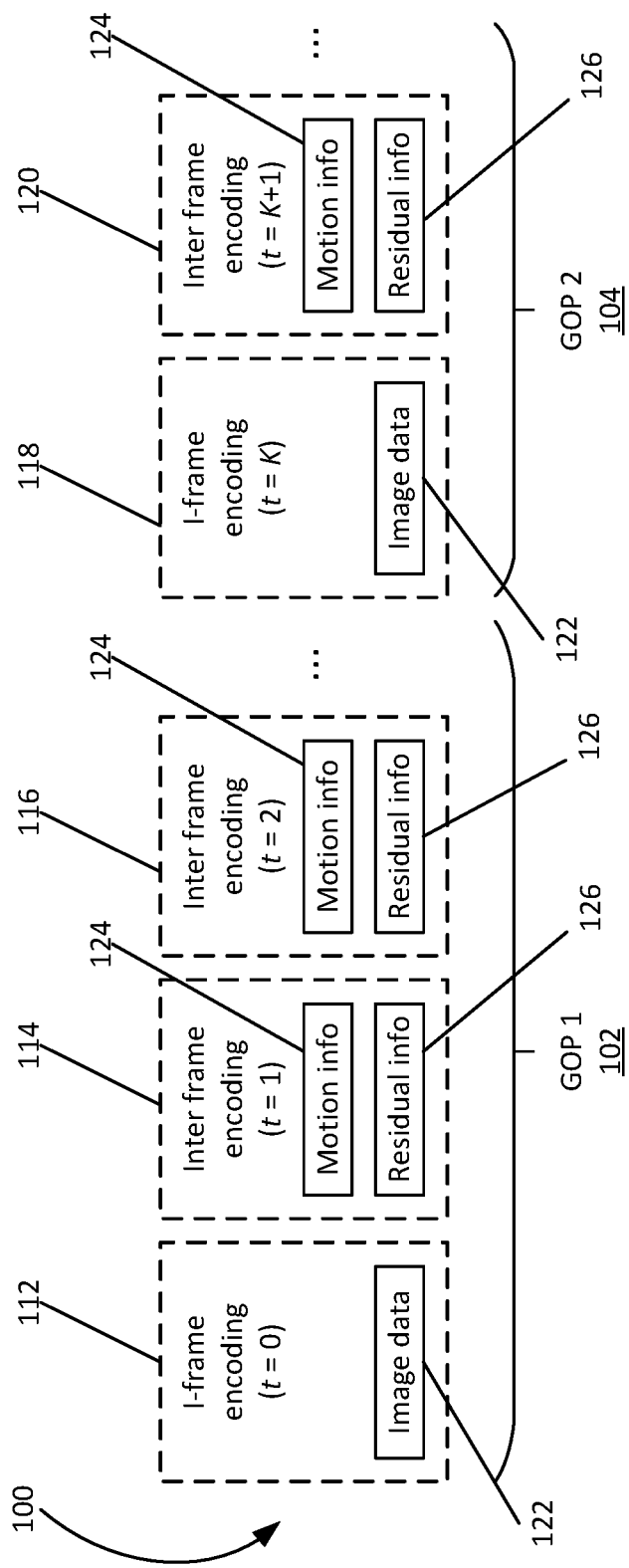
FIG. 1 is block diagram of the structure of an example compressed video 100, showing an example environment in which example embodiments may operate.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

Example embodiments of methods, devices and computer-readable media for processing a compressed video to perform an inference task will now be described. Some example embodiments use models trained using machine learning algorithms (also called "machine learning models" or simply "models"), such as trained neural networks, to perform all or part of the methods and operations described herein. Examples herein may be described with reference to a specific type of inference task, such as action recognition (AR), but it will be appreciated that other inference tasks, such as various computer vision tasks, may be performed using the adaptive techniques described herein. For example, the adaptive techniques embodied in the methods, devices, and media described herein may be used to assist with computer vision tasks such as video retrieval, video captioning, temporal localization, temporal detection, object detection, object tracking, spatio-temporal localization, semantic segmentation, or scene understanding.

The existing approaches to adaptive AR described above use RGB images as one of the inputs. However, videos are often encoded into compressed formats, also known as compressed video streams or simply compressed video, in order to save storage and bandwidth. A decoding process must be performed to generate the RGB frames encoded in the compressed video before the frames can be used as input to an adaptive AR process. A device or process performing encoding and/or decoding of a compressed video stream may be referred to as a codec, meaning coder/decoder, or as an encoder (for encoding) or a decoder (for decoding).

Modern video codecs, such as various MPEG codecs including MPEG-1, MPEG-2, MPEG-4, and H.264/MPEG-4 AVC codecs, exploit the redundancy between adjacent frames of a video to achieve a high compression ratio, i.e. the ratio between the size of the uncompressed video prior to encoding and the compressed video stream after encoding. For example, for the MPEG-4 format: let the current frame (at time=t) and the immediately previous frame in the temporal sequence of video frames (at time=t−1) be denoted as $I_t \in \mathbb{R}^{H \times W \times 3}$ and $I_{t-1} \in \mathbb{R}^{H \times W \times 3}$, respectively. A video encoder essentially estimates a motion vector (MV) map $MV_t \in \mathbb{R}^{H \times W \times 2}$ and a residual map $R_t \in \mathbb{R}^{H \times W \times 3}$ so that the pixel value of $I_t$ at any position p can be recovered by $I_t(p)=I_{t-1}(p+MV_t(p))+R_t(p)$. As a result, the frame $I_t$ is replaced with $MV_t$ and $R_t$ in the encoded video stream, and for most videos, $MV_t$ and $R_t$ can be encoded with much fewer bits than the original pixel values because the physical world tends to evolve on a continuous basis and both large motions and sudden changes are relatively rare. When encoding a video, a video encoder typically splits the video into multiple groups-of-pictures (GOPs), each of which includes a temporal sequence of frames starting with an intra-coded frame (I-frame) followed by one or more inter frames (such as P-frames or B-frames). The initial I-frame of a GOP is encoded in the compressed video stream as an independent image: i.e., an I-frame encoding includes image data, without including a motion vector (MV) map or a residual map. The subsequent inter frames in a GOP are encoded in the compressed video stream as inter frame encodings including their respective motion information (e.g., a motion vector (MV) map) and residual information (e.g., a residual map), which are used to reconstruct the respective inter frame by transforming one or more reference frames in the temporal sequence (e.g., the initial I-frame of the GOP or a prior inter frame of the GOP). A P-frame encoding is unidirectional and typically includes only a single MV map and a single residual map, defining the P-frame in relation to a single reference frame (e.g., the immediately prior frame in the temporal sequence). A B-frame encoding is bidirectional and typically includes two MV maps and two residual maps, defining the B-frame in relation to two reference frames (e.g., the immediately prior frame and the immediately subsequent frame in the temporal sequence). P-frames and B-frames are referred to herein as "inter frames", and their encodings as "inter frame encodings".

In practice, a GOP may include tens to hundreds of consecutive inter frames with only one I-frame, pushing the compression ratio to a very high level. In some examples, the number of frames included in a GOP is fixed; in other examples, different GOPs in a compressed video stream may include different numbers of frames. The number of frames included in a given GOP may be determined, in some examples, by characteristics of the video frames being encoded, e.g., a boundary between two consecutive frames corresponding to a cut from one shot to another may be used as the boundary between the end of one GOP and the beginning of another, based on the degree of visual discontinuity between the two frames. It will be appreciated that modern video encoding techniques may structure compressed videos, GOPs, I-frame encodings, and inter frame encodings in various ways that are consistent with the embodiments described herein.

FIG. 1 shows the structure of an example compressed video 100. The compressed video 100 includes a plurality of frame encodings (shown as frame encodings 112, 114, 116, ... 118, 120, ... ) representative of a temporal sequence of frames, beginning with a first I-frame encoding 112 representative of a first I-frame at t=0, followed by an immediately subsequent first inter frame encoding 114 at t=1, followed by an immediately subsequent second inter frame encoding 116 at t=2, optionally followed by one or more additional inter frame encodings, followed by a second I-frame encoding 118 representative of a second I-frame at t=M, followed by an immediately subsequent further inter frame encoding 120 at t=M+1, optionally followed by one or more additional frame encodings. The plurality of frame encodings are segmented into one or more groups of pictures (GOPs), each of which may encompass a fixed or variable number of frame encodings, such as positive integer K number of frame encodings in GOP 1 102 shown in FIG. 1. The first GOP, GOP 1 102, includes the first I-frame encoding 112 and multiple (i.e., K−1) subsequent inter frame encodings (including first inter frame encoding 114 and second inter frame encoding 116) representative of inter frames subsequent to the first I-frame in the temporal sequence, and a second GOP, GOP 2 104, includes the second I-frame encoding 118 and multiple subsequent inter frame encodings (including further inter frame encoding 120) representative of inter frames subsequent to the second I-frame in the temporal sequence. As described above, each I-frame encoding 112, 118 includes image data 122 representative of a frame, and each inter frame encoding 114, 116, 120 includes motion information 124 and residual information 126 of the respective inter frame relative to one or more reference frames in the temporal sequence, which are used to generate the corresponding inter frame in combination with the one or more reference frames. In the present disclosure, the term "temporal information" may be used to refer to either or both of the motion information and/or residual information of a frame. In some examples, the motion information 124 of an inter frame encoding (such as 114, 116, or 120) includes a motion vector (MV) map of the corresponding frame relative to a reference frame, and the residual information 126 of the inter frame encoding includes a residual map of the corresponding frame relative to the reference frame. For example, the motion information 124 and residual information 126 of the first inter frame encoding 114 may include a motion vector (MV) map and a residual map used to define or generate the first inter frame relative to the first I-frame of the first I-frame encoding 112.

Thus, in decoding the compressed video 100, a decoder may first decode GOP 1 102. The decoder will decode the image data 122 of the first I-frame encoding 112 and use the resulting frame (i.e. an RGB image) as the video frame at t=0. The decoder will then decode or generate the first inter frame at t=1 by decoding the motion information 124 and residual information 126 from the first inter frame encoding 114, then applying video decompression techniques to reconstruct the inter frame at t=1 by transforming the image at t=0 using the motion information 124 and residual information 126. The second inter frame at t=2 is similarly decoded by transforming the reconstructed first inter frame at t=1 using the motion information 124 and residual information 126 decoded from the second inter frame encoding 116.

When a new GOP is encountered in the compressed video 100, such as GOP 2 104, the decoder begins the process again. The first frame encoding of the GOP is an I-frame encoding, such as second I-frame encoding 118 of GOP 2 104, and is decoded in the same manner as the first I-frame encoding 112, resulting in generation or decoding of a frame at t=K. Subsequent inter frames of the new GOP are decoded based on their respective previously decoded reference frames.

In some embodiments, the compressed video 100 is a compressed video stream being received by a device, and the decoding process may be performed by a decoder before the entire compressed video 100 has been received. In some embodiments, the decoder may begin decoding frames from frame encodings of the compressed video 100 after obtaining only a portion of the compressed video 100, such as a single I-frame encoding, a single GOP, or any other portion of the compressed video 100 including at least one I-frame encoding (which must be obtained in order to establish a baseline frame from which subsequent inter frames are to be reconstructed).

Existing video codecs typically decode the frames of the compressed video 100 as described above, generating as output a temporal sequence of frames as RGB images. The other information decoded from the compressed video 100, such as the motion information 124 and residual information 126 decoded from each inter frame encoding, is discarded once it has been used to decode or reconstruct the respective inter frame as an image. However, embodiments described herein may use a modified video decoder to retain this motion and/or residual information and leverage the pre-existing motion information 124 and residual information 126 encoded in the compressed video 100, in combination with the decoded or reconstructed frames, to assist with adaptive inference tasks, as described in greater detail below with references to FIGS. 3A-3B and 4B-12.

Some existing AR approaches operate on compressed video data. See, e.g., (Wu, Chao-Yuan et al. "Compressed Video Action Recognition." 2018 IEEE/CVF Conference on Computer Vision and Pattern Recognition (2018): 6026-6035, hereinafter "Wu") and (Huo, Yuqi et al. "Mobile Video Action Recognition." arXiv abs/1908.10155 (2019), hereinafter "Huo"). However, these existing approaches do not describe the use of motion and residual information from compressed video data to perform adaptive AR or otherwise perform salience analysis of video data prior to inferential processing. Example embodiments described herein may improve upon existing adaptive AR or other adaptive inference approaches at least in part by leveraging pre-existing motion and/or residual information encoded in compressed video data to improve the efficiency and/or accuracy of the adaptation process.

Example devices will now be described that perform the adaptive inference operations and methods described herein.

Example Device

Figure 2:
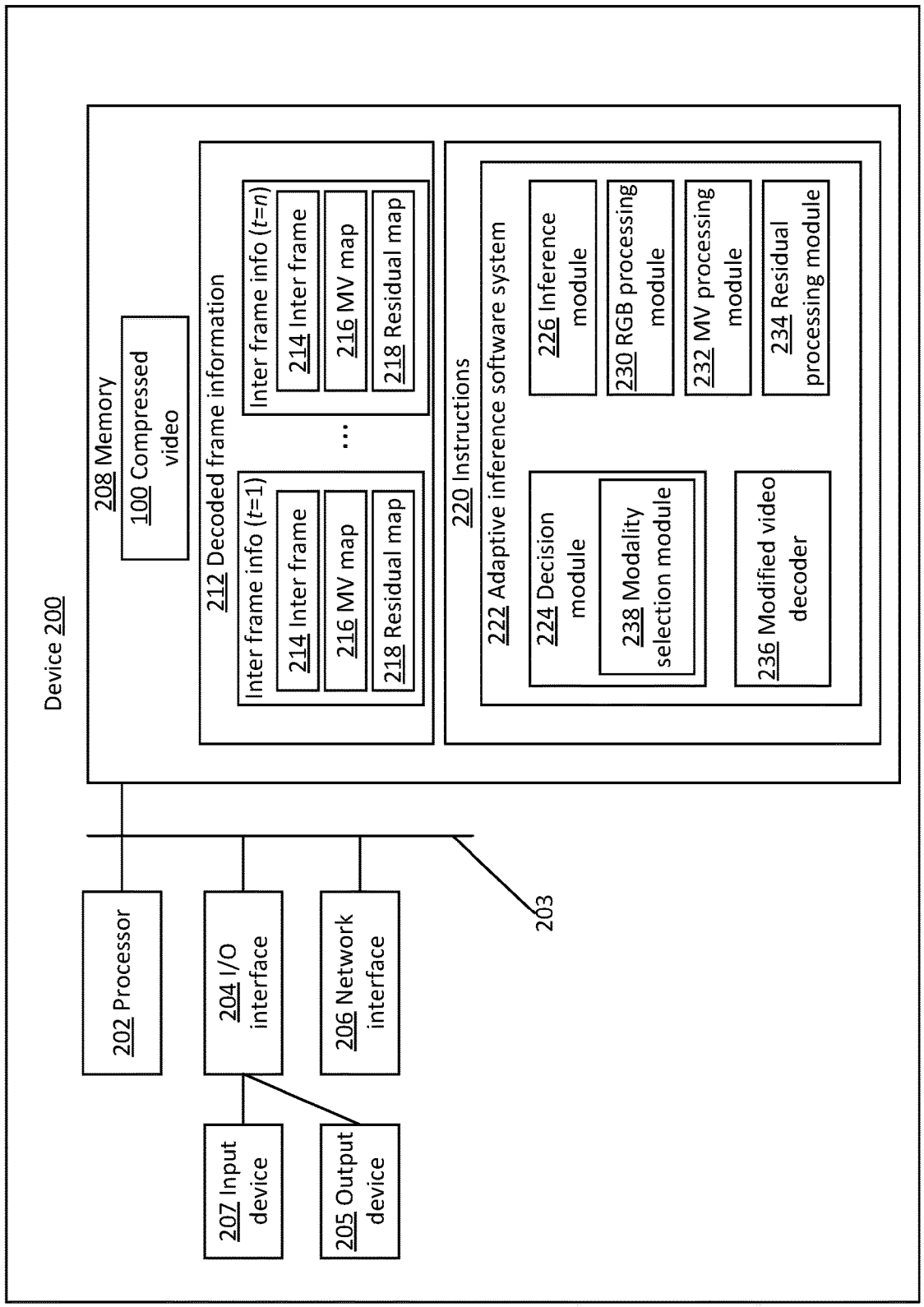
FIG. 2 is a block diagram of an example device for performing the methods described herein, according to example embodiments described herein.

FIG. 2 is a block diagram illustrating a simplified example of a device 200, such as a computer or a cloud computing platform, suitable for implementing examples described herein, and in particular for executing the method steps and operations described herein. Other examples suitable for implementing embodiments described in the present disclosure may be used, which may include components different from those discussed below. Although FIG. 2 shows a single instance of each component, there may be multiple instances of some components in the device 200.

The device 200 may include one or more processor devices, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof (the processor devices being referred to collectively as a processor 202). The device 200 may also include one or more optional input/output (I/O) interfaces (collectively referred to as I/O interface 204), which may enable interfacing with one or more input devices 207 (such as a keyboard, mouse, touchscreen, or camera) and/or output devices 205 (such as a display or speaker).

In the example shown, the input device(s) 207 and output device(s) 205 are shown as external to the device 200. However, it will be appreciated that some embodiments may combine one or more of the input devices 207 and/or output devices 205 into a single device.

The device 200 may include one or more network interfaces for wired or wireless communication with one or more devices or systems of a network, such as a network (collectively referred to as network interface 206). The network interface 206 may include wired links (e.g., Ethernet cable) and/or wireless links (e.g., one or more antennas) for intra-network and/or inter-network communications. In some embodiments, the device 200 may communicate with one or more of the input devices 207 and/or output devices 205 over a network using the network interface 206 instead of the I/O interface 204.

The device 200 may include one or more non-transitory memories (collectively referred to as memory 208), which may include a volatile or non-volatile memory (e.g., a flash memory, a random access memory (RAM), and/or a read-only memory (ROM)). The non-transitory memory 208 may store instructions 220 for execution by the processor 202, such as to carry out examples described in the present disclosure. The memory 208 may also include other processor-executable instructions 220, such as for implementing an operating system and other applications/functions. In some examples, the memory 208 may include instructions 220 for execution by the processor 302 to implement an adaptive inference software system 222, including modules and sub-modules thereof, such as a modified video decoder 236, a decision module 224, and a modality selection module 238, an inference module 226, and one or more modality-specific processing modules (shown as an RGB processing module 230, a MV processing module 232, and a residual processing module 234), as described further below with reference to FIGS. 3A-3B and 4B-8. The adaptive inference software system 222 may be loaded into the memory 208 by executing the instructions 220 using the processor 202.

The memory 208 may also store data used and/or generated by the adaptive inference software system 222. A compressed video 100, or a portion thereof, may be stored in the memory 208, for example after being received from an external source (e.g., via the network interface 206) and before and during processing by the adaptive inference software system 222. Frame encodings of the compressed video 100 may be decoded by the modified video decoder 236 of the adaptive inference software system 222, and the decoded frame information 212 of each frame encoding may be stored in the memory 208, including a decoded frame 214 (such as the image data 122 of an I-frame encoding or a reconstructed inter frame in RGB image format for an inter frame encoding), a decoded MV map 216 (or other motion information) of an inter frame encoding, and/or a decoded residual map 218 (or other residual information) of an inter frame encoding. Video frames 210 generated by the modified video decoder 236 may also be stored in the memory 208, for example before being transmitted via the network interface 206 or provided to a trained inference model (such as inference model 226) for performance of an inference task.

In some examples, the device 200 may additionally or alternatively execute instructions from an external memory (e.g., an external drive in wired or wireless communication with the device 200) or may be provided with executable instructions by a transitory or non-transitory computer-readable medium. Examples of non-transitory computer readable (i.e. processor readable) media include a RAM, a ROM, an erasable programmable ROM (EPROM), an electrically erasable programmable ROM (EEPROM), a flash memory, a CD-ROM, or other portable memory storage.

The device 200 may also include a bus 203 providing communication among components of the device 200, including those components discussed above. The bus 203 may be any suitable bus architecture including, for example, a memory bus, a peripheral bus or a video bus.

It will be appreciated that various components and operations described herein can be implemented on multiple separate devices or systems in some embodiments. In such examples, the bus 203 may be a network link or other communication link enabling communication between multiple devices or components of the system.

In some embodiments, one or more of the operations of the adaptive inference software system 222 described herein may be performed by hardware logic instead of software, for example by including as part of the device 200 one or more application-specific integrated circuits (ASICs) or field programmable gate arrays (FPGAs) configured to perform the described operations. For example, the modified video decoder 236 shown in FIGS. 3A-3B may be implemented as a hardware decoder in some embodiments.

Machine Learning

Machine Learning (ML) is an artificial intelligence technique in which algorithms are used to construct or build a "model" (i.e. a complex, parametrized function) for a specific task from sample data that is capable of being applied to new input data to perform the specific task (i.e., making predictions or decisions based on new input data) without being explicitly programmed to perform the specific task.

As used herein, "model" shall refer to a machine learned model. A machine learned model refers to an executable computational structure, such as processor-executable software instructions, that can be executed. During training of the model, the parameters of the model are learned using sample data (e.g. data from a training dataset). Once the model has been trained, the trained model can be deployed and operated in an inference mode (e.g. applied to new input data) to perform the specific task (i.e. make predictions or decisions based on the new input data).

The machine learned models described herein may be approximated by differentiable convolutional neural networks that have been trained (e.g., using supervised learning) to perform a task, such as video frame selection, salience analysis, adaptive processing of video data, or performance of an inference task. In some embodiments, one or more models may be trained independently of the other components of the adaptive inference software system 22. In other embodiments, the adaptive inference software system may include multiple sub-models that are trained jointly as an end-to-end trained model. For example, in some embodiments described herein, the inference module 226 is trained separately from the decision module 224, whereas in other embodiments the inference module 226, decision module 224, and modality-specific processing modules 230, 232, 234 are trained jointly as an end-to-end trained model.

It will be appreciated that various embodiments of the devices and methods described herein may be applicable to other tasks described herein, other neural network architectures (such as fully connected or recurrent neural networks), and other machine learning techniques, including other deep learning techniques, with appropriate changes to certain operations. Furthermore, some of the embodiments of the devices and methods described herein may have applications outside of the machine learning context. For example, some deterministic, non-machine-learning-based embodiments of the decision module 224 described herein may be used to select video frames for processing using non-machine-learning-based processing techniques.

The structure and operation of the adaptive inference software system 222 will now be described with reference to FIGS. 3A-3B and 4B-12. The schematic diagrams of the adaptive inference software system 222 and its modules and submodules in FIGS. 3A-3B and 4B-8 will be described in connection with the steps and operations of the methods performed thereby, shown in the flowcharts of FIGS. 9-12.

Adaptive Inference Software System

Figure 3A:
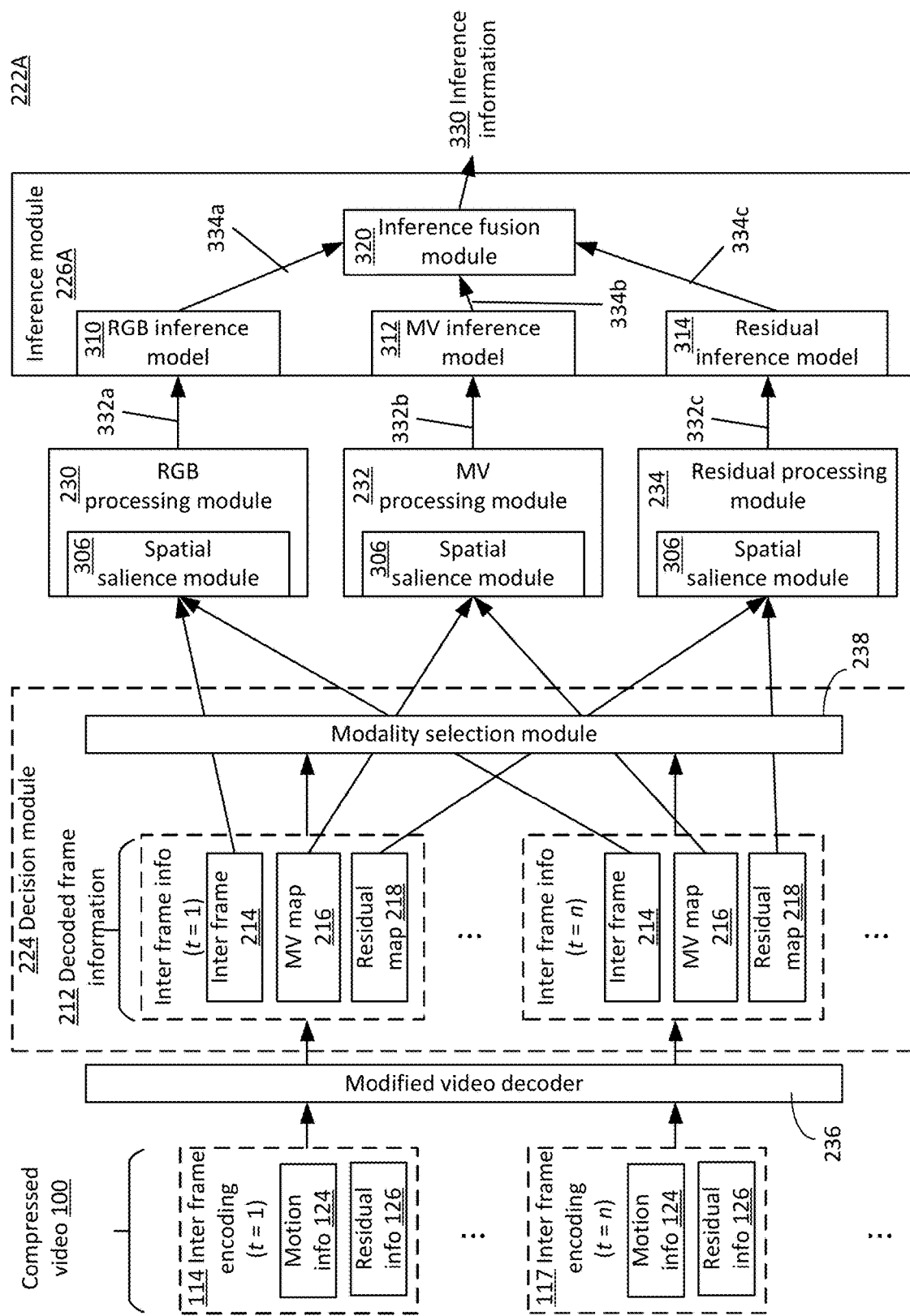
FIG. 3A is a schematic diagram showing the operation of a first example of the adaptive inference software system of FIG. 2.

FIG. 3A is a schematic diagram showing data flows of a first example adaptive inference software system 222 (222A in this example embodiment) as implemented by the processor 202. The adaptive inference software system 222 takes a compressed video 100 as input. The adaptive inference software system 222 uses the inference module 226 to adaptively perform an inference task, based on adaptation decisions made by the decision module 224. A modified video decoder 236 is used to generate decoded video information 212 including not only decoded images (i.e. inter frames 214), but also motion vector (MV) maps 216 and residual maps 218, for all inter frames.

Figure 9:
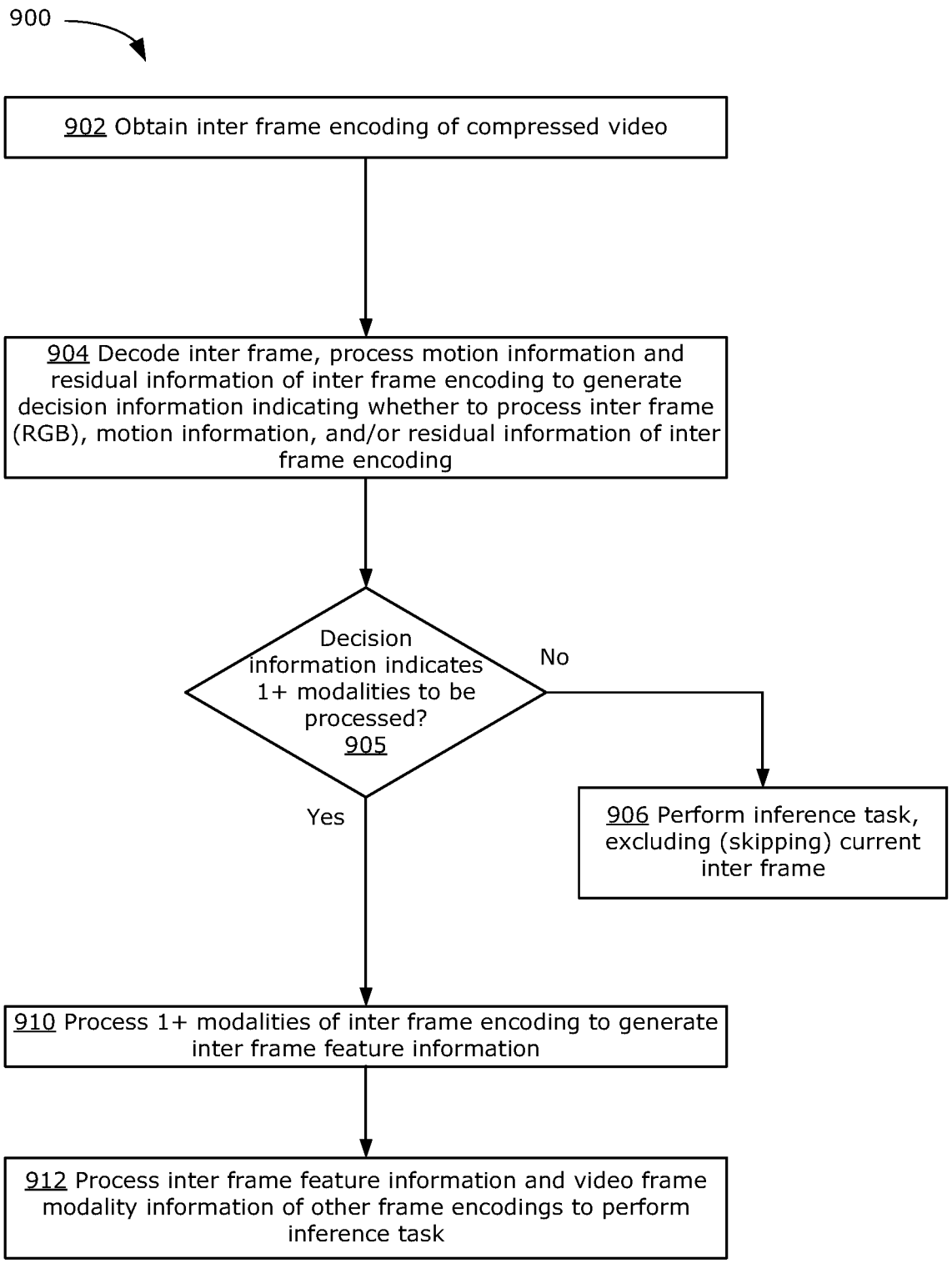
FIG. 9 is a flowchart showing steps of an example method for processing a compressed video to perform an inference task, according to example embodiments described herein.

FIG. 9 is a flowchart of an example method 900 for example method for processing a compressed video to perform an inference task. The steps of method 900 will be described with reference to the adaptive inference software system 222 of FIG. 3A. It will be appreciated that the method 900 may be implemented using other means in some embodiments.

At 902, at least a portion of the compressed video 100 is obtained, including an inter frame encoding (such as first inter frame encoding 114). For example, the processor 202 may obtain the compressed video 100, or a portion thereof including the inter frame encoding, from the memory 208. As described above with reference to FIG. 1, the compressed video stream includes a plurality of frame encodings representative of a temporal sequence of frames, with the temporal sequence represented in FIG. 3A extending downward vertically from the first inter frame encoding 114 (corresponding to a first inter frame at t=1), through an nth inter frame encoding 117 (corresponding to an nth inter frame at t=n), and optionally including further frame encodings corresponding to further frames in the temporal sequence. Each inter frame encoding includes temporal information (i.e. motion information 124 and residual information 126) defined relative to a reference frame (e.g., an earlier frame) in the temporal sequence: for example, in an embodiment in which the inter frames are conventionally defined P-frames, the first inter frame motion information 124 and residual information 126 may be defined relative to the first I-frame of the first I-frame encoding 112 shown in FIG. 1, and the nth inter frame motion information 124 and residual information 126 may be defined relative to the inter frame at (t=n−1) in the temporal sequence. It will be appreciated that, in some embodiments (e.g., embodiments processing B-frames), an inter frame encoding may include motion information and/or residual information defined relative to a first reference frame, as well as motion information and/or residual information defined relative to one or more additional reference frames.

Throughout this disclosure, an inter frame being processed by the adaptive inference software system can be assumed to be first inter frame encoding 114 and may be referred to as inter frame encoding 114, and the inter frame 214 decoded from the inter frame encoding 114 may be referred to as inter frame 214, for ease of reference. It will be appreciated that the embodiments described herein are equally applicable to processing of any other inter frame encoding in the compressed video 100, such as nth inter frame encoding 117.

At 904, the temporal information (i.e. motion information 124 and/or residual information 126) of the inter frame encoding 114 is processed by the decision module 224 to generate decision information 512. In addition to motion information 124 and/or residual information 126 of the inter frame encoding 114, the decision module may also process the reconstructed inter-frame 214. The decision module 224 includes a modality selection module 238. The inter encoding 114 is first decoded by the modified video decoder 236 to generate the MV map 216 and residual map 218 based on the motion information 124 and residual information 126, respectively, of the inter frame encoding 114. The modified video decoder 236 also generates the inter frame 214 (i.e. an RGB image of the inter frame of the decoded video data 212) at this step 904.

After the modified video decoder 236 generates the MV map 216, the residual map 218, and the reconstructed RGB image of the inter-frame 214, the modality selection module 238 selects zero or more modalities of the inter frame encoding 114 for further processing, said selection being represented by decision information 512. In some embodiments, the decoded frame information 212 generated by the modified video decoder 236 is provided directly as an input to the modality-specific processing modules 230, 232, 234 and the inference module 226A instead of being relayed by the selection module 224 as shown in FIG. 3A. Such alternative approaches are also suitable to modify the configurations of the example software systems 222B, 222C, and 222D shown in FIGS. 3B, 7, and 8 in various embodiments.

FIG. 4A and FIG. 4B show a high-level comparison of conventional RGB-based adaptive inference (in FIG. 4A) relative to examples described herein of adaptive inference in the compressed video domain (such as the adaptive inference software system 222, whose operations are shown at a high level in FIG. 4B).

Whereas existing RGB-based adaptive AR approaches described above tend to operate on uncompressed video data, the example of FIG. 4A shows a hypothetical example of an RGB-based adaptive AR system operating on compressed video data. In FIG. 4A, a frame encoding 401 (e.g., an I-frame or inter frame) of the compressed video 100 is decoded by a conventional video decoder 402, thereby generating a reconstructed single image 403 (e.g., an RGB image) of the frame encoded in the frame encoding 401. The subsequent operations correspond to existing RGB-based, frame selection, adaptive AR approaches described above: a frame selection module 404 determines whether the single image 403 will be processed; if so, the single image 403 is preprocessed by a single image preprocessing module 406, whose output is provided to a motion extraction module 408 to extract temporal information from the single image 403 relative to other frames in the temporal sequence. After the motion information has been extracted, the preprocessed single image 403 is processed by a single image model 410 (such as a CNN) to generate image feature maps 412. The image feature maps 412 are used by an inference module 414 to perform the inference task. Thus, any temporal (e.g., motion) information encoded in the video must be reconstructed from the RGB images of the video frames, after each video frame has been reconstructed from the compressed video encodings.

In contrast, FIG. 4B shows the general operation of the adaptive inference software system 222. The inter frame encoding 114 is decoded by the modified video decoder 236 to generate the decoded frame information 212, which includes a MV map 216 and residual map 218 for each decoded frame. The MV map 216 and/or residual map 218 represent temporal information that may be taken into account by the modality selection module 304, without the need to reconstruct the temporal information from the RGB image frames of the video. Based on the decisions made by the modality selection module 304, one or more of the inter frame 214, MV map 216, and/or residual map 218 are processed further by respective modality specific processing modules 230, 232, 234, whose output(s) are processed by the inference module 226 to perform the inference task. Thus, the temporal information is provided directly by the compressed video 100 without the need to reconstruct temporal information from the reconstructed RGB images of the video.

Figure 5:
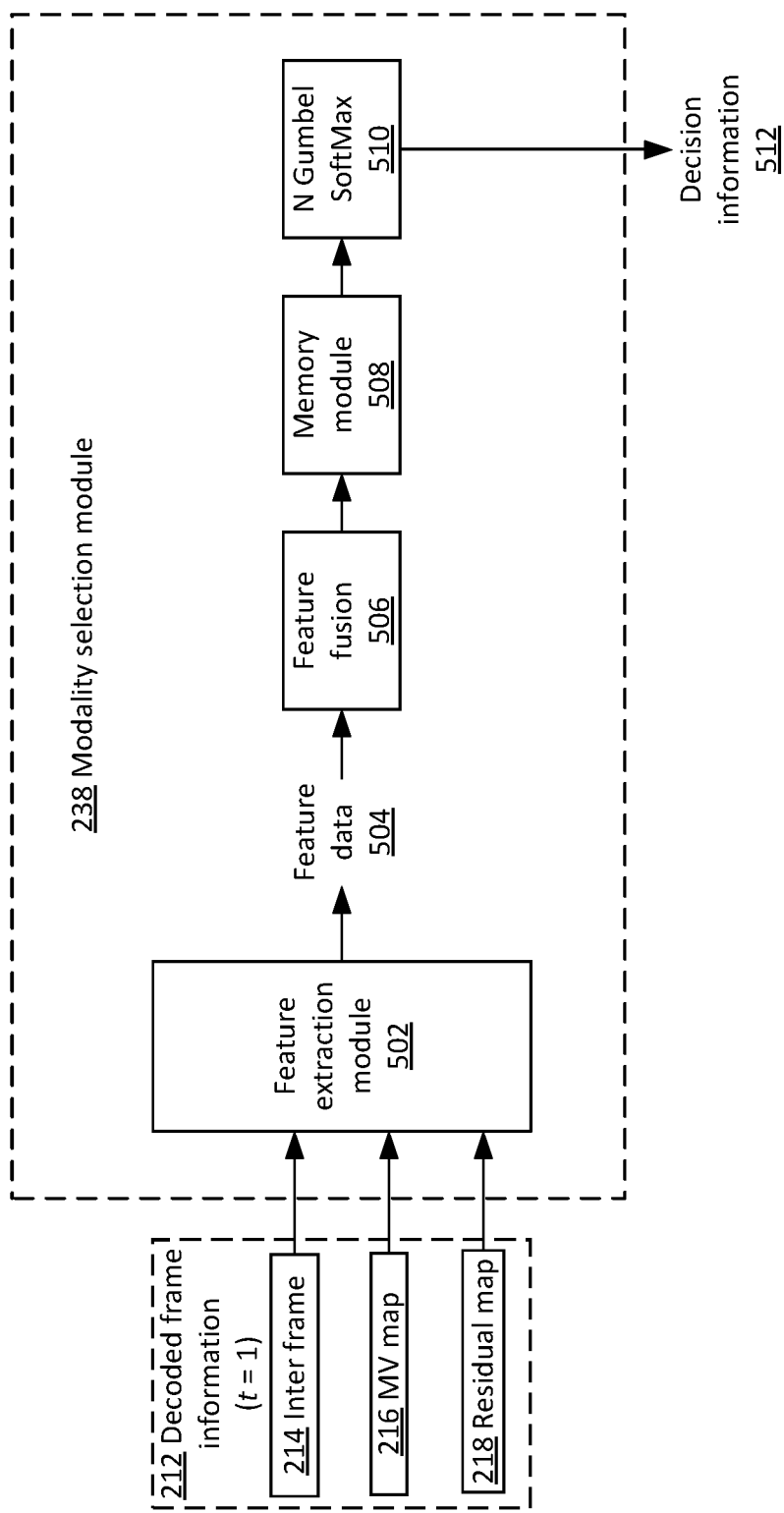
FIG. 5 is a schematic diagram showing the operation of an example of the modality selection module of FIG. 2.

FIG. 5 shows details of the operation of the modality selection module 238 to generate the decision information 512 indicating which, if any, of one or more modalities of the inter frame encoding are to be processed further. The modality selection module 238 receives at least a portion of the temporal information (e.g., the MV map 216 and/or the residual map 218) decoded from the inter frame encoding 114. In some embodiments, the complete set of temporal information (i.e. the MV map 216 and the residual map 218), and/or the inter frame 214, may also be received and processed by the modality selection module 238. A feature extraction module 502 is used to extract feature information from the one or more modalities (i.e., the MV map 216, and optionally the residual map 218 and/or inter frame 214) of the inter frame encoding 114 to generate feature data 504. The feature extraction module 502 may be a light-weighted model (e.g. a CNN with a relatively small number of learnable parameters) configured to extract features from a single modality or a combination of the modalities to extract features therefrom. For example, the feature extraction module 502 may include a separate sub-model (such as a CNN) for processing each modality, or may include a single CNN that processes an input tensor consisting of a concatenation of two or more of the modalities. Thus, the feature extraction module 502 applies a set of differentiable functions $f_i(\theta_i)$, parametrized by $\theta_i$, wherein each function $f_i$ processes one modality, or a single differentiable function $f(\theta)$, parametrized by $\theta$, processing a single modality or a concatenation of two or more of the modalities. The extracted features of the one or more modalities are represented in the feature data 504, denoted as feature maps $F_i$ for each modality i.

In embodiments extracting feature information from more than one modality using separate sub-models of the feature extraction module 502, the feature data 504 is then processed by a feature fusion module 506 to fuse the feature data 504 of the modalities into a single set of features. In some embodiments, the feature fusion module 506 may perform a relatively straightforward operation such as a concatenation operation to fuse the features from each modality. In other embodiments, the feature fusion module 506 may perform a more complex fusion operation, such as a learned fusion operation implemented by a further trained sub-model such as a CNN.

The feature information 504 (or, if a fusion module 506 is used, the fused feature information generated by the fusion module 506), denoted as single feature map F, is processed by a memory module 508. The memory module 508 may be a memory DL module, such as a recurrent neural network (RNN) with long short-term memory (LSTM) or a convolutional LSTM. The memory module 508 also applies a differentiable function $g(\vartheta)$, parametrized by $\vartheta$, as a standalone component or composed with $f(\theta)$ or multiple modality-specific $f_i(\theta_i)$s (i.e. $g(f)$). In the latter case, g accepts F as input. The memory module 508 generates a feature vector G that will be used for the final decision making, i.e. to generate the decision information 512. Additional fully-connected layers of the memory module 508 may then be used on the feature vector G to generate a final feature vector V.

In some embodiments, the fusion module 506 may be omitted, and multiple feature maps $F_i$ may be processed by the memory module 508 to generate multiple feature maps $G_i$. Multiple memory modules 508 can likewise be used per modality. The additional fully-connected layers may then be used on the multiple output features $G_i$ to produce multiple final feature vectors $V_i$.

In some embodiments, cross-modal input fusion may also be performed on $F_i$ using cross-modal attention, or a simple feature concatenation can be used on $F_i$.

The modality selection module 238 processes the final feature vectors $V_i$ (or single final feature vector V) to generate the decision information 512 using a number N of Gumbel-Softmax operations 510. A single Gumbel-Softmax operation 510 may be used in some embodiments; in others, a set or a composition of Gumbel-Softmax is used to allow for multiple modalities to be modeled for the inter frame encoding 114. In some embodiments, reinforcement learning may be used in place of the Gumbel-Softmax operations 510. Gumbel-Softmax is described in (Jang, Eric et al. "Categorical Reparameterization with Gumbel-Softmax." ArXiv abs/1611.01144 (2017)).

The decision information 512 generated by the modality selection module 238 indicates which, if any, of one or more modalities of the inter frame encoding are to be processed further (as described below). In some embodiments, the decision information 512 is a binary indicator of whether or not the inter frame 214 should be kept (for further processing, or for inclusion in a subset of frames to be processed further) or skipped (i.e., excluded from further processing). In some embodiments, the decision information 512 indicates either to skip the inter frame 214 or to include one or more of the modalities of the inter frame encoding 114 in further processing steps. For example, in some embodiments, the decision information 512 can indicate any combination of 0, 1, 2, or 3 modalities of the inter frame encoding 114 to include in further processing steps. In other embodiments, the decision information 512 may indicate only a smaller subset of such possible combinations: for example, some embodiments may never include the residual information 216 in the possible combinations to be included in further processing, and other embodiments may be configured such that the decision information 512 can indicate only a few predetermined combinations, such as [skip, RGB image, RGB image+MV map].

In general, the purpose of the modality selection module 238 is to select the modalities of the inter frame encoding 114 that are deemed to be salient to the inference task being performed by the inference module 226. In some embodiments, this salience may be learned using end-to-end training of the decision module 224 and inference module 226. In other embodiments, this salience may be determined based on pre-defined heuristics, such as the deterministic motion-based heuristics described below with reference to FIGS. 7, 8, and 12.

In some embodiments, the decision information 512 may also indicate additional information, such as an input resolution and/or model capacity for further processing of the selected modalities. In other embodiments, these choices regarding input resolution and/or model capacity are made offline (e.g., they are dictated by hyperparameter settings that are determined outside of the scope of the adaptive inference software system 222).

In some embodiments, the decision module 224 may include a spatial attention module for focusing attention on subsets of pixels, or spatial regions, of the one or more selected modalities (e.g., the RGB image inter frame 214, the MV map 216, or the residual map 218). Spatial attention focusing techniques are described below with reference to FIG. 6.

In some embodiments, the decision module 224 includes a memory block (not shown) to store information about previously decoded and processed inter frame encodings of the compressed video 100, to assist in generating the decision information 512 of subsequent inter frame encodings. The decision module 224 outputs the decision information 512, which is used by the subsequent steps of the method 900.

At 905, if the decision information 512 indicates that the current inter frame 214 is to be skipped (i.e. that no modalities of the inter frame encoding 114 are to be included in further processing), the method 900 proceeds to step 906, otherwise the method 900 proceeds to step 907.

At 906, the inference module 226 performs the inference task for which it is trained. The performance of the inference task is independent of the current inter frame encoding 114: i.e., it is only based on information included in other frame encodings of the compressed video 100. Thus, step 906 is the result if the decision module 224 decides that the current inter frame 214 (and any other information included in, or derived from, the inter frame encoding 114) is not salient enough to include in the performance of the inference task.

At 910, the one or more selected modalities of the inter frame encoding 114 (e.g., the inter frame 214, the MV map 216, and/or the residual map 218), as indicated by the decision information 512, are processed further to generate inter frame feature information. In some embodiments, this further processing is performed by a separate modality-specific processing module respective to each selected modality, shown in FIG. 3A as an RGB processing module 230, a MV processing module 232, and a residual processing module 234. In some embodiments, the adaptive inference software system 222 may include multiple versions of each modality-specific processing module, such as versions having different model capacities (such as relatively lighter or heavier parameterization). In some embodiments, such as some embodiments in which the inference task is performed offline (i.e. not as part of the adaptive inference software system 222), decisions regarding model capacity for the modality-specific processing modules may be made offline.

Figure 6:
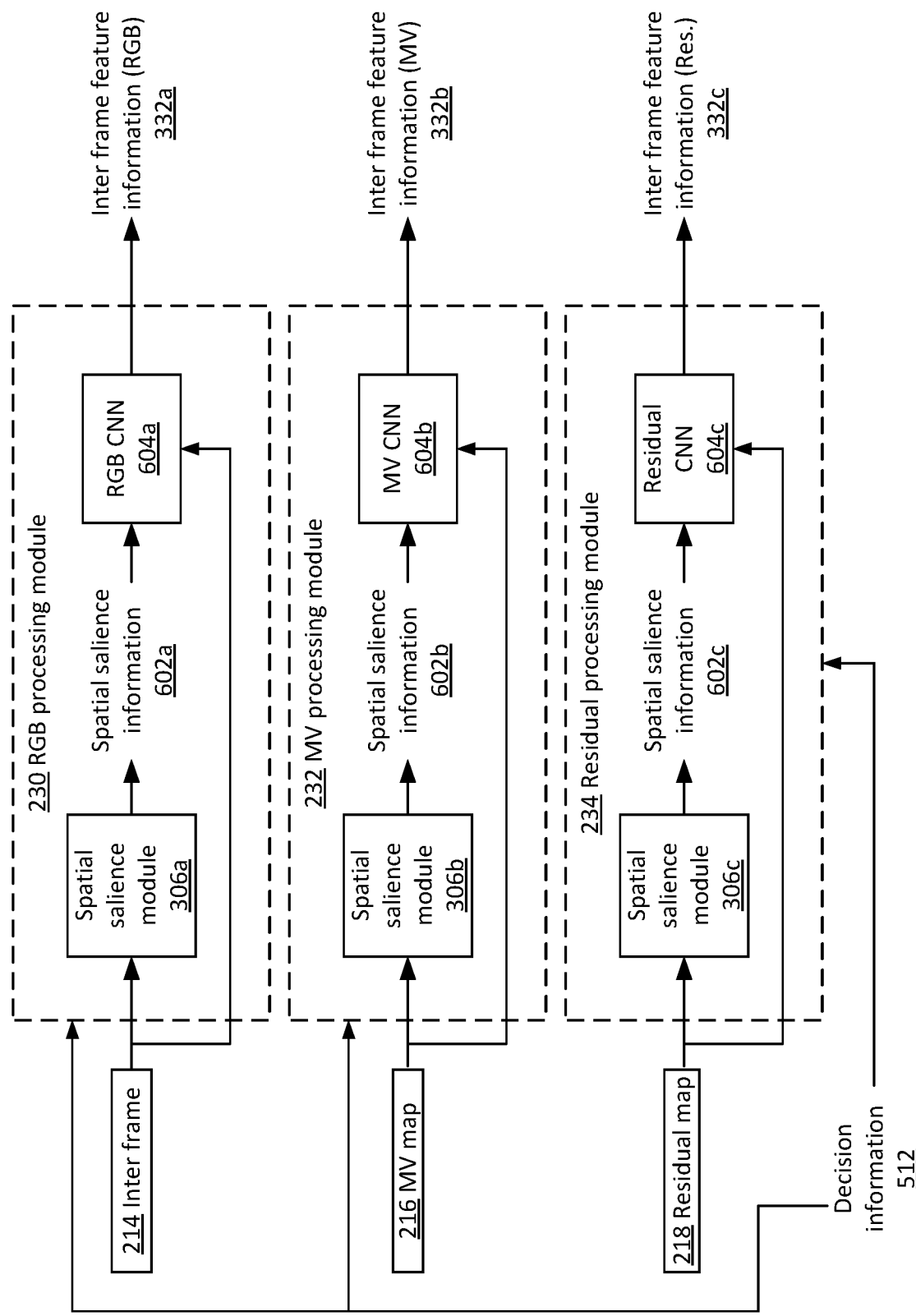
FIG. 6 is a schematic diagram showing the operation of an example set of modality-specific processing modules of the FIG. 3A or 3B.

FIG. 6 shows details of the operation of a set of three example modality-specific processing modules 230, 232, 234. The RGB processing module 230 receives the inter frame 214 as input. In the examples discussed herein, we assume that the inter frame 214 is a 3-channel image (i.e. Red, Green, and Blue channels) that can be expressed as a tensor of the size H×W×3, wherein H is the pixel height and W is the pixel width of the inter frame 214. The MV processing module 232 receives the MV map 216 as input. In the examples discussed herein, we assume that the MV map 216 is a 2-component vector field (i.e. horizontal (x) and vertical (y) vector components) that can be expressed as a tensor of the size H×W×2. The residual processing module 234 receives the residual map 218 as input. In the examples discussed herein, we assume that the residual map 218 is a 3-channel image (R, G, B channels) of motion-compensated RGB residuals that can be expressed as a tensor of the size H×W×3. In some embodiments, the MV map used as input to the MV processing module 232 is not the MV map 216 decoded from the inter frame encoding 114, but is instead a cumulative motion map derived from a sequence of inter frame encodings between two samples, as described below with reference to FIGS. 7, 8, and 12.

If the decision information 512 indicates that a given modality 214, 216, 218 is to be excluded from further processing, then the corresponding modality-specific processing module 230, 232, 234 is not used during step 910 of the method 900. However, each modality-specific processing module 230, 232, 234 engaged by the decision information 512 performs the operations described below.

Figure 10:
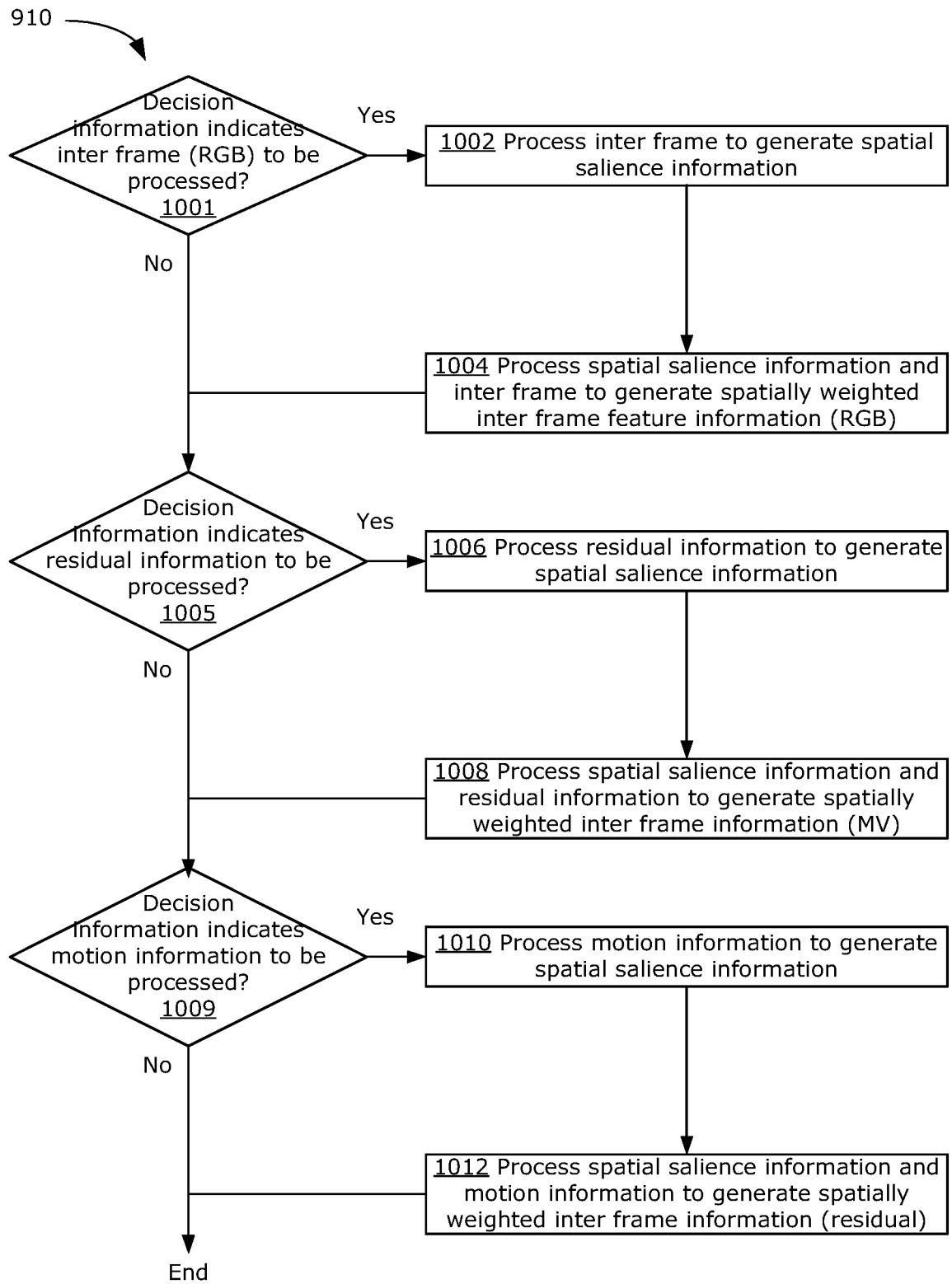
FIG. 10 is a flowchart showing example sub-steps of the step of the method of FIG. 9 of processing one or more modalities of an inter frame encoding to generate inter frame feature information.

FIG. 10 shows details of an example set of operations of step 910 of method 900 as performed by an example set of modality-specific processing modules 230, 232, 234. Operations of the modality-specific processing modules 230, 232, 234 will be described with reference to FIG. 6 and FIG. 10.

At 1001, the decision information determines whether the RGB processing module 230 is to be used to process the inter frame 214. If so, the method proceeds to step 1002; if not, to step 1005.

At 1002, the RGB processing module 230 processes the inter frame 214 using a RGB spatial attention module 306a to direct processing attention to spatial regions (e.g., pixel regions) of the inter frame 214. The RGB attention module 306a typically consists of a small number (such as 1 or 2) of convolutional or residual neural network layers for direct mapping from the inter frame 214 to RGB spatial salience information 602a, such as an attention map or region of interest (ROI). In some embodiments, the RGB spatial attention module 306a may take as input the feature maps $F_i$ and/or $G_i$ previously generated by the decision module 224, in place of or in addition to the decoded inter frame 214.

In some embodiments, the spatial salience information 602a generated by the RGB spatial attention module 306a is soft spatial salience information, such as an attention map (e.g., dimensions $H_a \times W_a$) indicating weight values at each pixel location that, when applied to one or multiple intermediate feature maps of the respective models 234, 232, 234 (note: the map may be downsampled to the corresponding feature map's spatial dimensions), weighs each feature map pixel location (over the totality of the map's channels) with an attentional weight indicating the degree in proportion to which each pixel or pixel region should affect the inference task. In some embodiments, the RGB spatial salience information 602s generated by the RGB spatial attention module 306a is hard spatial salience information, such as a ROI comprising a set of coordinates indicating a cropping operation to be performed on the inter frame 214, thereby limiting further processing of the inter frame 214 to the cropped ROI. The cropping operation may be a differentiable cropping operation, allowing this component to be trained with other components end-to-end. The pixel height and pixel width of the inter frame 214 could be reduced from H×W to a smaller region $H_r \times W_r$, contained within H×W, while maintaining the same number of channels. The cropping operation may thus effectively be regarded as achieving the same result as a binary (i.e., hard) attention map, wherein a given pixel or pixel region is given a weight of either 1 or 0, although it may be implemented using a cropping operation.

In some embodiments, the RGB spatial attention information 602a (e.g., the attention map or the cropping coordinates for the ROI) is combined with the inter frame 214 to generate a cropped ROI of the modality being processed (hard attention). In other embodiments, the RGB spatial salience information 602a is incorporated into modelling by the CNNs 604 described below to weigh the model feature maps (soft attention). It will be appreciated that, in embodiments using ROI cropping, the subsequent images or maps being processed will be smaller in pixel dimensions and therefore the modules processing this data will be configured accordingly.

A differentiable backbone model (shown as RGB CNN 604a, MV CNN 604B, or residual CNN 604c) is provided for each processed modality, each model (generically, 604) being denoted as $m_i(\alpha_i)$ parametrized by $\alpha_i$. Each model $m_i$ 604 is a CNN model in the illustrated embodiment, but in some embodiments may be a general DNN model or other differentiable function. In some embodiments, mobile-efficient CNNs (i.e. CNNs capable of effective deployment on computationally limited edge devices like mobile devices) are used for the backbone models 604: e.g., Mobilenet-V2 (MBv2) CNN models of different widths (1.0, 0.75, 0.5, 0.25), EfficientNet of different capacities, GhostNet, or similar such mobile-efficient models. Due to the low dynamic ranges of the MV maps 216 and residual maps 218, in particular, the modality-specific processing modules 232, 234 for these modalities may allow for processing with very low-capacity and efficient networks (e.g., MBv2 0.5 or similar), and low input resolutions likewise.

At 1004, the RGB CNN 604a processes the RGB spatial attention information 602a and the inter frame to generate spatially weighted inter-frame feature information 332, specifically RGB-mode spatially weighted inter-frame feature information 332a.

The above steps are repeated for each other modality (although it will be appreciated that, in some embodiments, each modality is processed in parallel and independently from each other modality). At 1005, the decision information determines whether the MV processing module 232 is to be used to process the MV map 216. If so, the method proceeds to step 1006; if not, to step 1009. At 1006, the MV processing module 232 processes the MV map 216 using a MV spatial attention module 306b to generate spatial salience information 602b. In some embodiments, the MV spatial attention information 602b is combined with MV map 216 to generate a spatially weighted MV map, such as a cropped ROI of the MV map 216. At 1008, the MV CNN 604b processes the MV spatial attention information 602b and the MV map to generate MV-mode spatially weighted inter-frame feature information 332b.

At 1009, the decision information determines whether the residual processing module 234 is to be used to process the residual map 216. If so, the method proceeds to step 1010; if not, step 910 ends (and method 900 proceeds to step 912). At 1010, the residual processing module 234 processes the residual map 218 using a residual spatial attention module 306c to generate spatial salience information 602c. In some embodiments, the residual spatial attention information 602c is combined with residual map 218 to generate a spatially weighted residual map, such as a cropped ROI of the residual map 218. At 1012, the residual CNN 604c processes the residual spatial attention information 602c and the residual map to generate residual-mode spatially weighted inter-frame feature information 332c.

Returning to FIG. 3A and FIG. 9, at step 912, the inter-frame feature information 332a, 332b, and/or 332c for each selected modality is processed by the inference module 226 to perform the inference task. The inference model 226 typically performs the inference task over many frames of the compressed video 100, such that the inference module 226 performs the inference task by processing a plurality of frame encodings of the compressed video 100, including the inter frame encoding 114 used to generate the inter-frame feature information 332a, 332b, and/or 332c. Thus, the operations of the decision module 224 determine whether the inter frame encoding 114 is included in the plurality of frame encodings processed by the inference module 226, and if so, extracts feature information from one or more selected modalities of the inter frame encoding 114 prior to processing by the inference module 226.

Figure 11A:
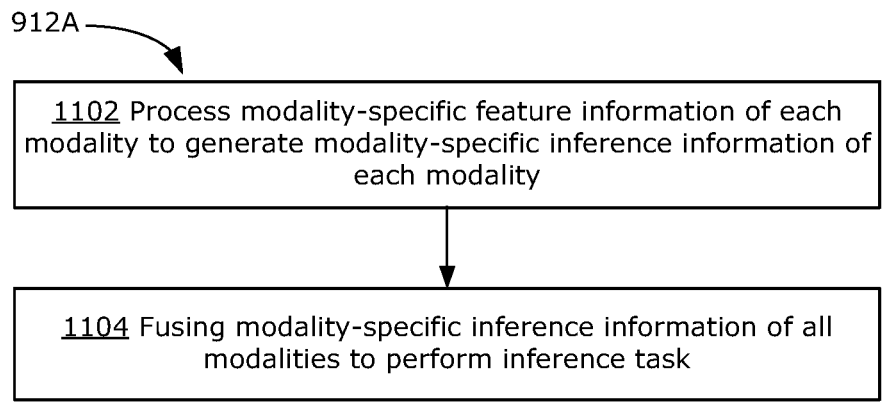
FIG. 11A is a flowchart showing a first set of example sub-steps of the step of the method of FIG. 9 of processing the inter frame feature information to perform the inference task.

FIG. 11A shows operations of an example step 912 of method 900, as implemented by the inference module 226 (226A in this embodiment) shown in FIG. 3A. The inference module 226A includes three modality-specific multi-class or binary classifiers or other inference models, such as deep CNNs including one or more fully connected layers. These are shown as RGB inference model 310, MV inference model 312, and residual inference model 314. At 1102, 1102 the modality-specific feature information of each modality is processed by the respective modality-specific inference model 310, 2312, 314 to generate modality-specific inference information 334a, 334b, 334c of each modality. The modality-specific inference information 334a, 334b, 334c includes inference or prediction information sufficient to complete the inference task, such as logits or a normalized probability distribution across the classes of the inference task. At 1004, the modality-specific inference information 334a, 334b, 334c of all processed modalities is then fused by an inference fusion module 320 to generate inference information 330, such as a single logits or probability distribution across the classes of the inference task, to complete the inference task. In some embodiments, the inference fusion module 320 performs a simple fusion (such as averaging); in other embodiments, the inference fusion module 320 performs a more complex fusion operation, such as multiplicative log probs fusion (i.e. multiplying the logarithms of the probabilities of each modality).

Figure 3B:
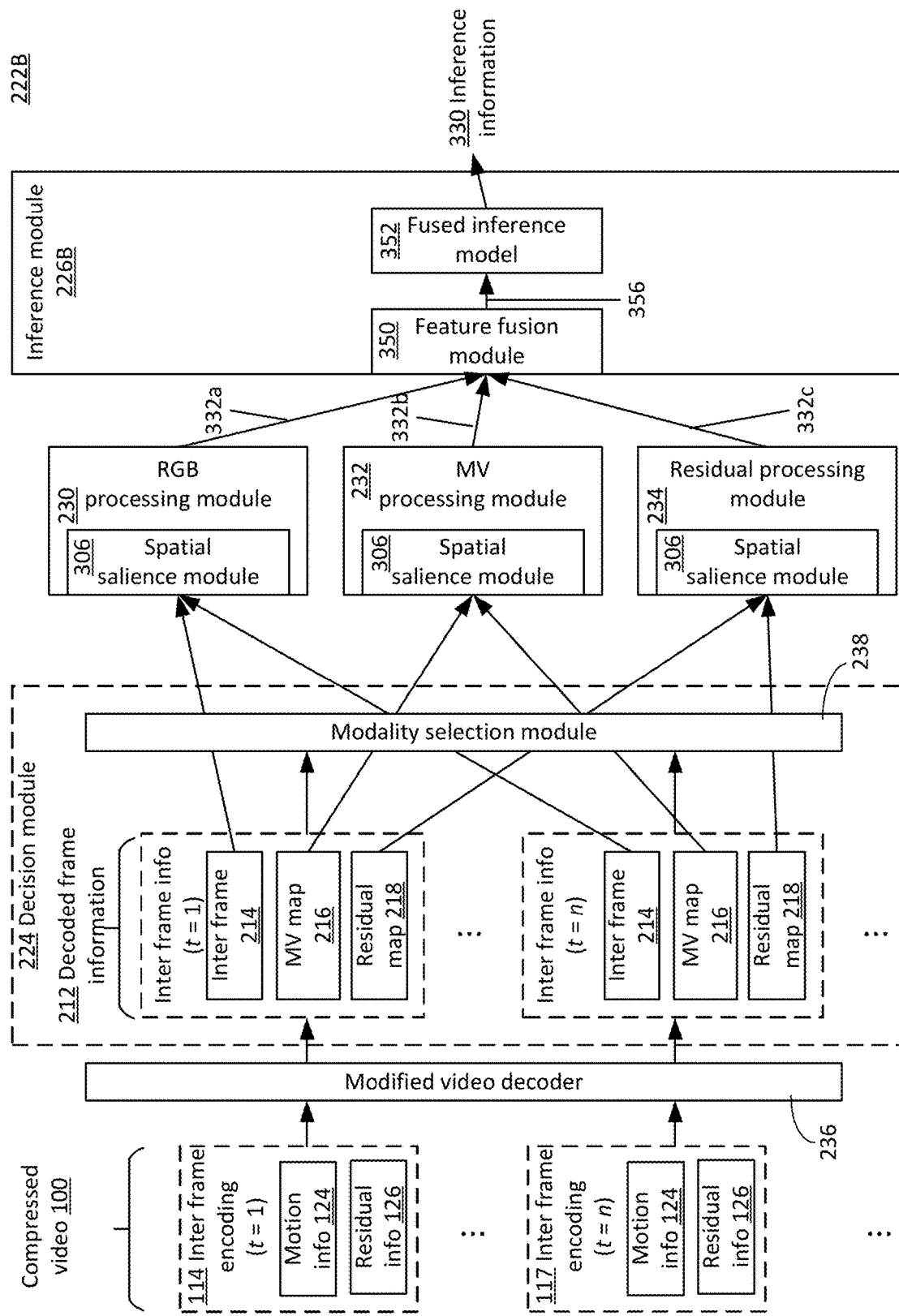
FIG. 3B is a schematic diagram showing the operation of a second example of the adaptive inference software system of FIG. 2.
Figure 11B:
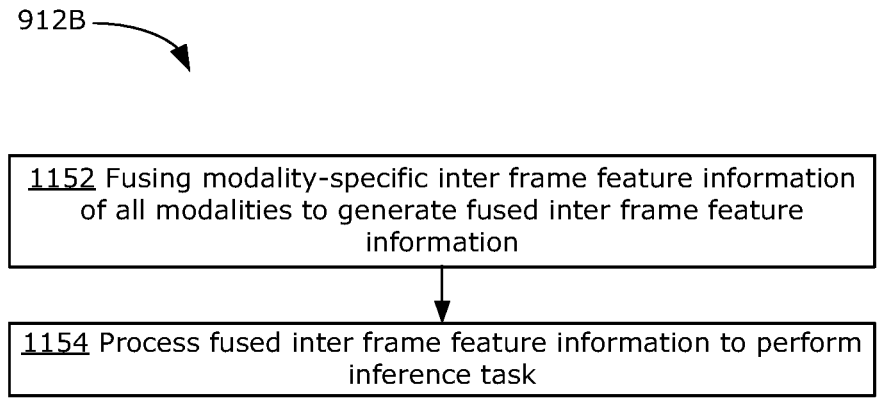
FIG. 11B is a flowchart showing a second set of example sub-steps of the step of the method of FIG. 9 of processing the inter frame feature information to perform the inference task.

FIG. 3B shows an alternative architecture 222B of the adaptive inference software system 222A of FIG. 3A, whose operations are shown in FIG. 11B. In the alternative architecture 222B, the inference module 226B reverses the order of operations of the first example inference module 226A described with reference to FIG. 3A and FIG. 11A above. At 1152, the inputs 332a, 332b, 332c to the inference module 226B are first fused by a feature fusion module 350. At 1154, the fused feature information 356 generated thereby is processed by a single fused inference model 352 to generate the inference information 330, thereby completing the inference task.

It will be appreciated that, in non-classification inference tasks, the inference information 330 may take other forms, generative data from a generative model such as a generative adversarial network (GAN). Furthermore, some classification tasks may result in inference information 330 classifying multiple objects, such as semantic segmentation information classifying each pixel in the inter frame 214. The techniques described above can be generalized to any inference task involving video data as input.

The differentiable components of the adaptive inference software system 222 of FIG. 3A or 3B, such as the CNNs and other machine learning models of the decision module 224, modality-specific processing modules 230, 232, 234, and the inference module 226, allow the various modules to be trained together as an end-to-end differentiable model. In some embodiments, the components of the adaptive inference software system 222 are trained end-to-end such that the learnable parameters of their various neural network layers or other model structures are jointly optimized to work together to perform the inference task as efficiently and accurately as possible in the domain of compressed video data. Any of a number of standard machine learning training techniques may be used to jointly train the sub-models of the adaptive inference software system 222, such as supervised, unsupervised, or semi-supervised learning techniques. Loss functions may be used in supervised learning, such as a cross-entropy loss (see, e.g., the nn.CrossEntropyLoss function of PyTorch) for an accuracy classification loss, and a GFlops count (i.e. gigaflops of processor resources expended) for an efficiency loss. Other suitable combinations of loss functions may be used in various embodiments: for example, a binary cross-entropy loss may be used instead of cross-entropy if a set of binary classifiers are used (see, e.g., the nn.BCELoss.html function of PyTorch).

As described above, specific embodiments of the adaptive inference software system 222 may only permit certain combinations of modalities to be processed, and the decision information 512 generated by the decision module 224 may be constrained accordingly. Such embodiments may also, accordingly, omit one or more modules downstream of the decision information 512, such as one or more modality-specific processing modules 230, 232, 234 and/or modality-specific inference models 310, 312, 314. In some embodiments, only RGB and MV modalities (214, 216) may be included in processing, and the number of modalities selected is always 1 (not 0 or 2), such that the decision information 512 is constrained to include only the possible combinations [RGB, MV]. In some embodiments, only RGB and MV modalities (214, 216) may be included in processing, and the number of modalities selected is always 1 or 0 (not 2), such that the decision information 512 is constrained to include only the possible combinations [RGB, MV, none/skip]. In some embodiments, only RGB and MV modalities (214, 216) may be included in processing, without further constraints, such that the decision information 512 is constrained to include only the possible combinations [RGB, MV, RGB+MV, none/skip].

Example embodiments described herein may exhibit one or more advantages that improve the functioning of the device—such as a mobile device or other edge device—performing the inference task using the adaptive techniques described above. By using compressed video data for adaptive inference, the example embodiments described above with reference to FIGS. 3A-3B, 5-6, and 9-11B may provide an efficient set of models for performing efficient processing of individual compressed videos 100, by exploiting the pre-existing motion and/or residual information already encoded in compressed video data, and by using 2D convolution to extract temporal information from individual frames, MV maps, and residual maps. The low dynamic-range of MV and residual maps allows for modelling with very light models (i.e. models of small capacity), and hence allows for significant computational and power savings. Some such embodiments may thereby optimize the processing time for performing the inference task on a given video, which may be especially important for power- and computationally-constrained platforms such as edge devices.

Furthermore, using compressed video data for adaptive AR or other adaptive inference tasks may reduce memory usage relative to existing approaches. The model capacity required by described embodiments may be smaller than existing approaches configured to process RGB data, thanks to the sparse and compact representations of motion and residual data relative to RGB data.

By decreasing processing time and/or memory usage, power consumption may also be reduced, thereby extending battery life of the device performing the processing, such as a mobile device.

The examples described above are suitable for online processing of the compressed video 100—i.e., the decision module 224, modality-specific processing modules 230, 232, 234, and the inference module 226 perform their operations concurrently on the compressed video 100. In some embodiments, GOPs of the compressed video 100 can be decoded and pre-processed by the decision module 224 in parallel with the further processing performed by the modality-specific processing modules 230, 232, 234, and the inference module 226. However, in some embodiments, after the models of the adaptive inference software system 222 have been trained, the adaptation decisions can be made offline relative to the further processing. I.e., the decision information 512 can be generated and stored (e.g., along with decoded frame information 212) by the decision module 224, and the further processing may be performed at a later time and/or on a different device.

Further examples will now be described with reference to FIGS. 7, 8, and 12. These further examples provide a simplified decision module 224, which can be used for either online or offline preprocessing of compressed video data to generate the decision information 512 and/or to select a subset of inter frames to either include in the further processing by an inference module to perform the inference task, or use as a larger pool of more informative frames to sample from (with some randomness) to perform model training and subsequent inference.

Figure 7:
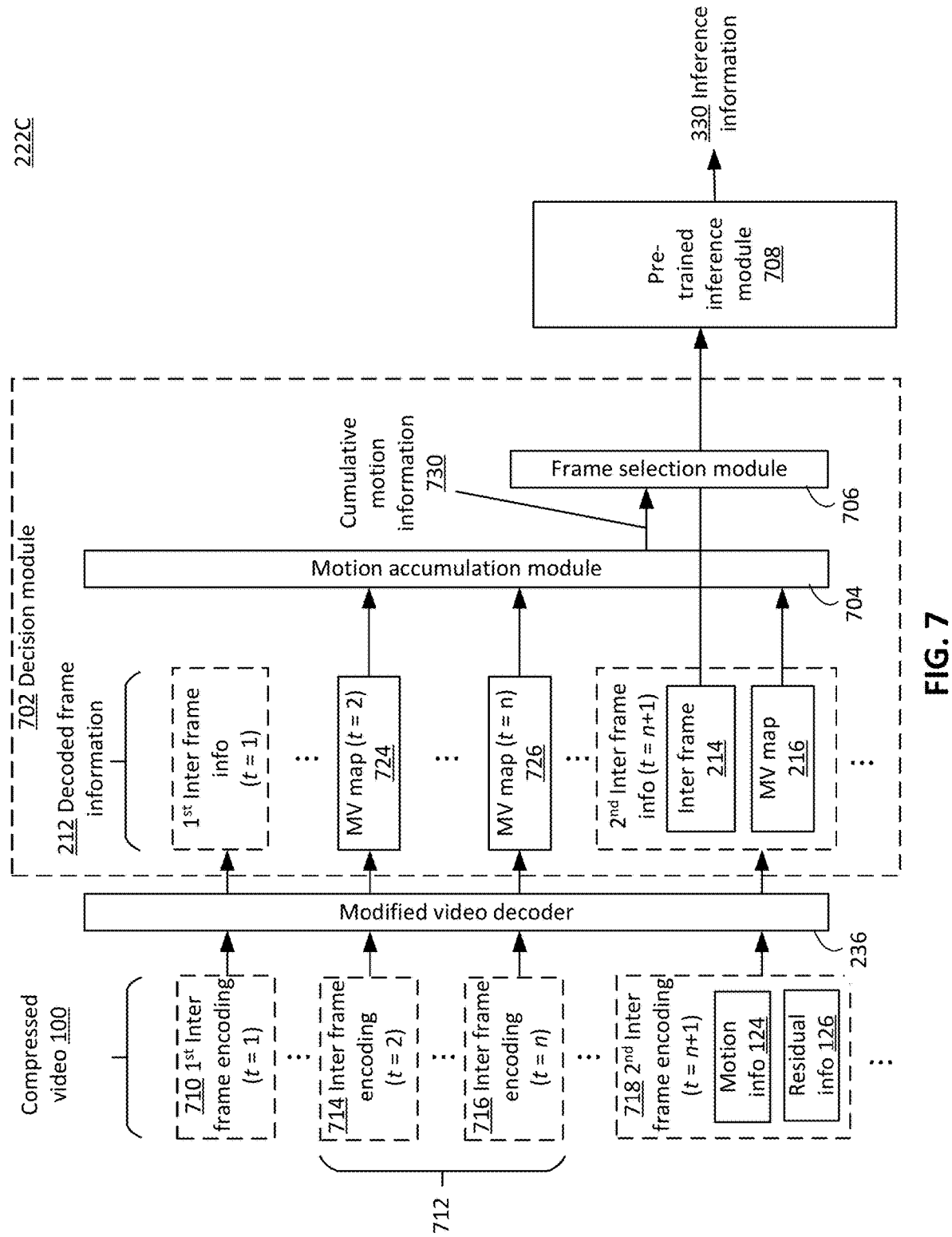
FIG. 7 is a schematic diagram of a first alternative example of the decision module of FIG. 2, configured to select individual frames from a compressed video for further processing in real time.

FIG. 7 shows a simplified version 222C of the adaptive inference software module 222, including a simplified decision module 702. The simplified adaptive inference software module 222C is intended for online processing of compressed video 100, like the examples described above. However, unlike the previously-described examples, the simplified decision module 702 is not trained end-to-end with the inference module. Instead, the simplified decision module 702 uses a deterministic motion-based heuristic to perform its decision-making operations (i.e. generate the decision information 512), and these decisions can be used online or offline by a pre-trained inference module 708 to perform the inference task.

The decision module 702 relies on accumulated motion over multiple frames to determine the importance (i.e. salience to the inference task) of a given RGB inter frame.

Figure 8:
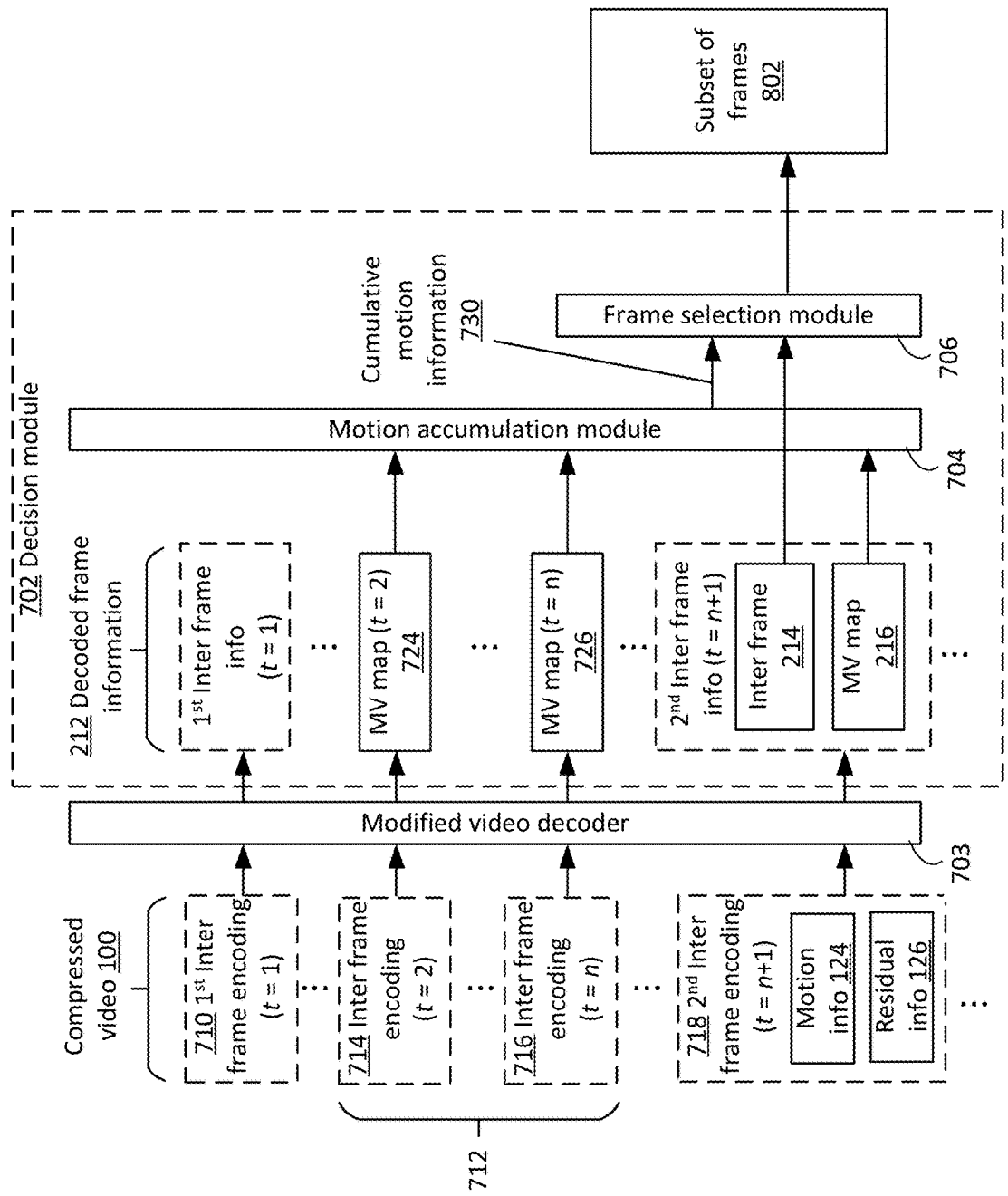
FIG. 8 is a schematic diagram of a second alternative example of the decision module of FIG. 2, configured to select a subset of frames from a compressed video for further processing offline.

One goal of the examples described with reference to FIGS. 7 and 8 is to preserve a highly informative set of RGB frames (e.g., subset of frame 802) in an ensemble of frames (e.g., the frame encodings of the compressed video 100) to process, with the assumption that there is high-redundancy between any two RGB frames, if the estimated motion between them is negligible.

FIG. 8 shows an alternative embodiment 222D of the simplified adaptive inference software module 222C intended for offline preprocessing of the compressed video 100. The goal for embodiment 222D is to 'softly' pre-filter the data and retain those frames, which together form a more informative frame-set. The differences relative to the simplified adaptive inference software module 222C of FIG. 7 are: 1) instead of selecting inter frames 214 for immediate, concurrent, or parallel (i.e. online) processing by the pre-trained inference module 708, the alternative embodiment 222D of FIG. 8 selects either: 1) a larger pool of frames decoded from the compressed video 100 and stores the selected frames to select a smaller subset to sample from (with some randomness) for model training at later time, or 2) a subset of frames to use directly for to perform the inference task.

Figure 12:
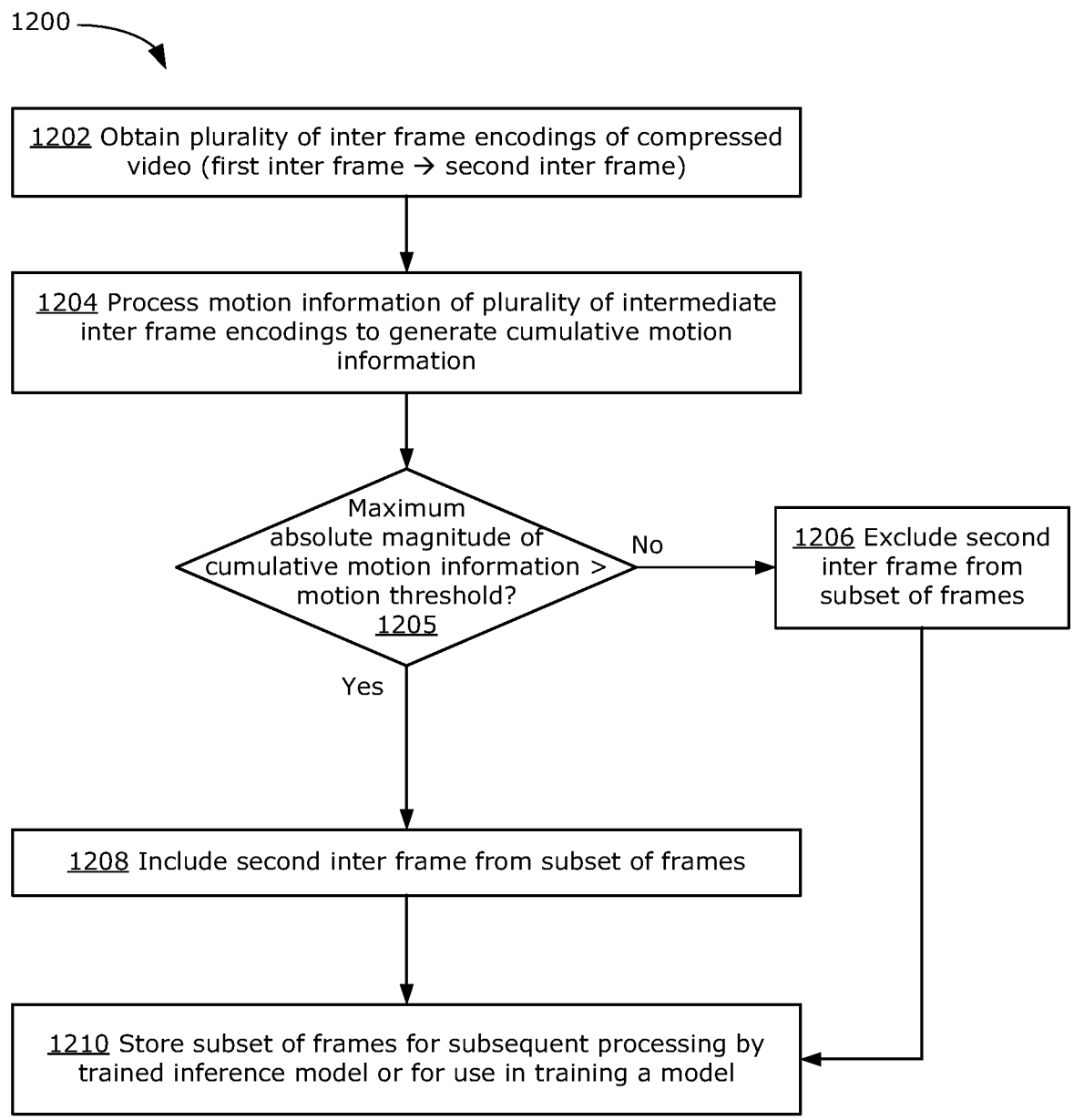
FIG. 12 is a flowchart showing steps of an example method for processing a compressed video to select and store a subset of frames of the compressed video for further processing to perform an inference task, according to example embodiments described herein.

FIG. 12 is a flowchart showing steps of an example method 1200 for selecting a subset of frames, decoded from a compressed video 100, for further processing to perform an action recognition task or to train a model to perform the action recognition task. The method 1200 is described in reference to the alternative simplified adaptive inference software module 222D of FIG. 8. However, it will be appreciated that the simplified adaptive inference software module 222C of FIG. 7 may perform essentially the same method 1200, with each selected frame being concurrently processed by the pre-trained inference model 708 in parallel with performance of the selection method 1200 by the simplified decision module 702.

At 1202, the alternative simplified adaptive inference software module 222D obtains a plurality of inter frame encodings of the compressed video 100 representative of a temporal sequence of frames. In the illustrated example of FIG. 8, the plurality of inter frame encodings include a first inter frame encoding 710 at (t=1) representative of a first inter frame at the beginning of the temporal sequence of frames, a second inter frame encoding 718 at (t=n+1) representative of a second inter frame at the end of the temporal sequence of frames, and a plurality of intermediate inter frame encodings 714 at (t=2) through 716 at (t=n), each intermediate inter frame encoding being representative of an inter frame between the first inter frame and the second inter frame in the temporal sequence of frames. As in the other examples described above, e.g. the example in FIG. 3A, each intermediate inter frame encoding 714 through 716 includes motion information of the respective intermediate inter frame relative to a respective reference frame in the temporal sequence of frames.

At 1204, the decision module 702 processes the motion information of the plurality of intermediate inter frame encodings 714 through 716 to generate cumulative motion information 730 representative of motion between the first inter frame 710 and the second inter frame 712. This processing is performed, in the illustrated example, by first, for each frame encoding of the plurality of intermediate inter frame encodings 714 through 716, processing the motion information of the respective inter frame encoding, using a modified video decoder 703 of the decision module 702, to generate a motion vector field, shown as MV map 724 (for the first intermediate inter frame at t=2) through MV map 726 (at for the n-1$^{th}$ intermediate inter frame t=n). In some embodiments, the MV map 216 of the second inter frame encoding 712 (at t=n+1) is also decoded by the modified video decoder 703. The motion vector fields (MV maps 724 through 726, and optionally MV map 216) are processed by a motion accumulation module 704 to generate a cumulative motion vector field. The cumulative motion vector field may be generated, for example, by vector field composition with coordinate resampling, starting from t=n+1 (at pixel positions (x,y)) backwards through t=2, summing up all the collected motion vectors at each related resampled coordinate on the path of each individual pixel position (x,y): $x_t, y_t$=Resample((x,y)+$MV_{totalt-1}$,(x,y)), t=n+1 through 2, with a step of −1, $MV_{totalt-1}$ is the sum of respective motion vectors up to time t−1, $MV_{total_t}$=$MV_{totalt-1}$+$MV_t(x_t,y_t)$, $MV_{totaln+1}$=$MV_{n+i}(x,y)$. This process results in a single MV map wherein the vector for each pixel location corresponds to the total movement of that pixel between the first inter frame at t=1 and the second inter frame at t=n+1. The motion accumulation module 704 then processes the vectors of the cumulative motion vector field to generate a maximum absolute magnitude of the cumulative motion vector field. For example, the length of the longest vector may be selected as representing the maximum absolute magnitude of the cumulative motion vector field, representing the pixel that has moved the farthest between the first inter frame at t=1 and the second inter frame at t=n+1. Motion vectors may first be downscaled to a much lower spatial resolution, prior to motion accumulation and subsequent decision making (by assessing the maximum motion vector magnitude). This may be done to: 1) adapt to innately lower motion vector field resolution (compared to the original video resolution), and/or 2) reduce the processing time.

At 1205, the frame selection module 706 compares the maximum absolute magnitude of the cumulative motion information 730 (i.e. of the cumulative motion vector field), denoted as max |$DMV_t$| to a motion threshold, denoted $MV_{thr}$, to generate decision information 512 (not shown). If max|$DMV_t$|>$MV_{thr}$, then the decision information 512 results in the method 1200 proceeding to step 1208; otherwise, the decision information 512 results in the method 1200 proceeding to step 1206.

At 1206, in response to decision information 512 indicating that the cumulative motion information 730 falls below the motion threshold, the frame selection module 706 excludes the second inter frame 214 from the subset of frames 802 selected for further processing. By excluding the second inter frame 214 from further processing, the decision module 702 skips the need to process the inter frame 214 (and potentially also its corresponding MV map 216 and/or residual map) further during the performance of the inference task (e.g., further processing by the pre-trained inference module 708 of FIG. 7). Low motion By examining the motion, redundant RGB inter frames may thus be excluded from computationally-intensive processing operations, thereby resulting in a reduced use of computing resources as described above. After step 1206, the method 1200 proceeds to step 1210.

At 1208, in response to decision information 512 indicating that the cumulative motion information 730 is above the motion threshold, the frame selection module 706 includes the second inter frame 214 in the subset of frames 802 to be processed further to perform the action recognition task. After step 1208, the method 1200 proceeds to step 1210.

At 1210, the subset of frames 802 (including the inter frame 214 if included in the subset 802 at step 1208) is stored in the memory 208 for subsequent processing (e.g., either for training as in embodiment 222D or for inference by a pre-trained inference module 708 as shown in FIG. 7, as in embodiment 222C). In some embodiments, processing the subset of frame 802 to train a model includes sampling a smaller subset of frames of the subset 802, and using the smaller sampled subset of frames to train the model. Typically, step 1210 is performed after several iterations of steps 1202-1208 on several respective temporal sequences of frames of the compressed video 100. In some embodiments, other information decoded from the second inter frame encoding 712 (e.g. MV map 216 and/or a residual map) may also be stored, and/or the second inter frame encoding 712 may be identified for later decoding and processing by identifying information stored in the memory 208 at step 1210.

As described above, the simplified adaptive inference software module 222C of FIG. 7 may perform steps 1202 through 1208 of the method 1200, but step 1210 may be replaced by, or take place concurrently with, processing of the selected inter frame (e.g. second inter frame 214) by the pre-trained inference module 708. In various embodiments, any suitable pre-trained inference model may be used in the pre-trained inference module 708 to perform the inference task, using as input the subset of frames 802, either one at a time or as a batch of input data, as well as optionally any other information stored with the subset of frames 802 such as MV map data. For example, the pre-trained inference module 708 may include an RGB processing module 230 and an inference module 226, wherein the inference module 226 is configured to receive and process RGB-mode spatially weighted inter-frame feature information 332a. In other embodiments, the pre-trained inference module 708 may also include a MV processing module 232 and/or a residual processing module 234 and an inference module 226, wherein the inference module 226 is configured to receive and process the MV-mode and/or residual-mode spatially weighted inter-frame feature information 332b and/or 332c.

The method 1200 may be performed more than once on different temporal sequences of frames of the compressed video 100. In some embodiments, the temporal sequences of frames are selected using a predetermined sampling period: for example, the compressed video 100 may be sampled at every n frames, such that the frame encoding immediately prior to first inter frame encoding 710 at t=1 is a first sample and the second inter frame encoding 712 at t=n+1 is a second sample. After the decision is made at step 1205 to include or exclude the second inter frame 214 from further processing, a third sample may be processed at (t=2n), and so on. The subset of such samples that satisfy the motion threshold at step 1205 are then included in the subset 802, to be processed online as they are individually selected (as in FIG. 7) or offline (as in FIG. 8).

In other embodiments, the temporal sequences of frames are chosen dynamically, depending on the magnitudes of the accumulated motion at each point. For example, first inter frame encoding 710 may be automatically included in the subset 802. Then motion information of each subsequent frame encoding of the compressed video 100 is used to update the computation of the cumulative motion information 730, until the second frame encoding 712 does not satisfy the motion threshold (i.e. the method 1220 excludes this second inter frame 214 from further processing by proceeding to step 1206). The frame is then included in the subset 802, and the accumulated motion is reset to zero. This process is repeated until the last video frame is examined.

In some embodiments, the fixed sampling period method described above may be used for online processing (as in FIG. 7). In some embodiments, the dynamic sampling may be used for offline processing (as in FIG. 8).

Methods and Processor Readable Media

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for selecting a subset of frames decoded from a compressed video for further processing to perform an action recognition task or to train a model to perform the action recognition task, the method comprising:
   obtaining a plurality of inter frame encodings of the compressed video representative of a temporal sequence of frames, the plurality of inter frame encodings comprising:
   a first inter frame encoding representative of a first inter frame at the beginning of the temporal sequence of frames;
   a second inter frame encoding representative of a second inter frame at the end of the temporal sequence of frames; and
   a plurality of intermediate inter frame encodings, each representative of an inter frame between the first inter frame and the second inter frame in the temporal sequence of frames; and
   each intermediate inter frame encoding comprising:
   motion information of the respective intermediate inter frame relative to a respective reference frame in the temporal sequence of frames;

processing the motion information of the plurality of intermediate inter frame encodings to generate cumulative motion information representative of motion between the first inter frame and the second inter frame;

processing the cumulative motion information to generate decision information, the decision information indicating whether the second inter frame should be included in the subset of frames; and selecting the subset of frames based on the decision information.

2. The method of claim 1, wherein:

processing the motion information of the plurality of intermediate inter frame encodings to generate cumulative motion information comprises:

for each frame encoding of the plurality of intermediate inter frame encodings, processing the motion information to generate a motion vector field;

processing the motion vector fields of all frame encodings of the plurality of intermediate inter frame encodings to generate a cumulative motion vector field; and processing the cumulative motion vector field to generate a maximum absolute magnitude of the cumulative motion vector field; and processing the cumulative motion information to generate decision information comprises:

comparing the maximum absolute magnitude of the cumulative motion vector field to a motion threshold to determine whether the second inter frame should be included in the subset of frames.

3. The method of claim 2, further comprising, after selecting the subset of frames:

storing the subset of frames for subsequent processing:

by a trained inference model to perform the action recognition task; or to train an inference model to perform the action recognition task.

4. A non-transitory processor-readable medium having tangibly stored thereon instructions that, when executed by a processor of a device, cause the device to perform the method of claim 1.

* * * * *